United States Patent
Senda et al.

(10) Patent No.: US 7,755,584 B2
(45) Date of Patent: Jul. 13, 2010

(54) VOLTAGE BOOSTING CIRCUIT, VOLTAGE BOOSTING/DROPPING CIRCUIT AND LCD

(75) Inventors: Michiru Senda, Tokyo (JP); Ryoichi Yokoyama, Tokyo (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 346 days.

(21) Appl. No.: 11/930,922

(22) Filed: Oct. 31, 2007

(65) Prior Publication Data
US 2008/0136388 A1    Jun. 12, 2008

(30) Foreign Application Priority Data
Dec. 11, 2006    (KR) .................... 10-2006-0125716

(51) Int. Cl.
*G02F 1/135*    (2006.01)
(52) U.S. Cl. ..................... 345/87; 345/82; 327/536
(58) Field of Classification Search .............. 345/87, 345/92, 103; 327/536
See application file for complete search history.

(56) References Cited

U.S. PATENT DOCUMENTS

| | | | |
|---|---|---|---|
| 5,774,099 A * | 6/1998 | Iwasaki et al. | 345/87 |
| 7,072,193 B2 | 7/2006 | Lin | |
| 7,148,740 B2 * | 12/2006 | Kobayashi et al. | 327/536 |
| 2005/0099167 A1 * | 5/2005 | Karube | 323/282 |
| 2005/0200310 A1 * | 9/2005 | Brown | 315/291 |
| 2005/0225377 A1 * | 10/2005 | Kobayashi et al. | 327/536 |
| 2009/0002083 A1 * | 1/2009 | Takahashi et al. | 331/1 A |

* cited by examiner

*Primary Examiner*—Bao Q Vu
(74) *Attorney, Agent, or Firm*—F. Chau & Associates, LLC

(57) ABSTRACT

A voltage boosting circuit performs variable frequency control that gradually increases frequencies of clock signals from a low frequency to a high frequency during a boosting operation period for which a low output voltage of a DC-DC converter when the power is turned on is boosted up to a predetermined voltage. Thus, the frequencies of clock signals may be set according to the boosting operation of the DC-DC converter. Consequently, the operation of the DC-DC converter may be stabilized until the stable operation period is performed after the DC-DC converter starts to operate.

16 Claims, 18 Drawing Sheets

VOLTAGE BOOSTING CIRCUIT, VOLTAGE BOOSTING/DROPPING CIRCUIT AND LCD

CROSS-REFERENCE TO RELATED APPLICATION

This application relies for priority upon Korean Patent Application No. 2006-125716 filed on Dec. 11, 2006, the contents of which are herein incorporated by reference in their entirety.

BACKGROUND OF THE INVENTION

1. Technical Field

The present disclosure relates to a voltage boosting circuit and a voltage boosting/dropping circuit that use a direct current-to-direct current (DC-DC) converter boosting or dropping an input voltage according to frequency setting information of input clock signals, and a liquid crystal display (LCD).

2. Discussion of Related Art

A voltage boosting circuit or a voltage boosting/dropping circuit, which uses a DC-DC converter, has been widely used for various electronic appliances requiring driving voltages.

A DC-DC converter acquires a desired predetermined voltage by boosting or dropping a supply voltage according to input clock signals and typically includes a circuit formed by combining a transistor, a condenser and the like. When such a DC-DC converter operates, starting control is performed, in which clock signals having a predetermined frequency are input to the DC-DC converter, so that the desired predetermined voltage can be obtained from the DC-DC converter.

The starting control of such a DC-DC converter is a problem, however because the clock signals having a predetermined frequency are simply input to the DC-DC converter.

Thus, because the output voltage of the DC-DC converter is a low voltage during the starting of the DC-DC converter, an operation of the DC-DC converter is unstable until the DC-DC converter obtains the desired output voltage, even if the clock signals having a predetermined frequency are input thereto. That is, the conventional starting control of the DC-DC converter is not performed according to a boosting operation or a dropping operation when the DC-DC converter starts to operate.

SUMMARY OF THE INVENTION

Exemplary embodiments of the present invention provide a voltage boosting circuit that stabilizes the operation of a DC-DC converter until the DOC-DC converter enters a stable operation period after the DC-DC converter starts to operate.

Exemplary embodiments of present invention provide a voltage boosting/dropping circuit that stabilizes the operation of a DC-DC converter until the DC-DC converter enters a stable operation period after the DC-DC converter starts to operate.

Exemplary embodiments of present invention also provide an LCD having the voltage boosting circuit.

In an exemplary embodiment of the present invention, a voltage boosting circuit incorporates a boosting circuit that includes transistors and boosts a supply voltage up to a predetermined voltage according to input clock signals, a frequency setting unit that sets frequencies of the clock signals used for a boosting operation period during which the boosting circuit boosts the supply voltage up to the predetermined voltage, and a frequency varying unit that alters the frequency of the clock signals during the boosting operation period of the boosting circuit based on the frequencies set by the frequency setting unit.

The transistors include thin-film transistors, and the frequency setting unit sets the frequencies of the clock signals according to characteristics of the transistors during the boosting operation period.

The boosting operation period is a time period extending until the predetermined voltage is output from the boosting circuit after the boosting circuit is powered on.

The frequency setting unit sets the frequencies of the clock signals corresponding to each period of the boosting operation period.

In an exemplary embodiment of the present invention, a voltage boosting circuit includes a boosting circuit that has transistors and that boosts a supply voltage up to a predetermined voltage according to input clock signals, and a frequency varying unit that alters the frequency of the clock signals according to an output voltage during a boosting operation period of the boosting circuit, in which the clock signals are used for the boosting operation period during which the boosting circuit boosts the supply voltage up to the predetermined voltage.

The transistors include thin-film transistors, and the frequency varying unit includes a ring oscillator.

In an exemplary embodiment of the present invention, a voltage boosting circuit includes a boosting circuit that incorporates transistors and that boosts a supply voltage up to a predetermined voltage according to input clock signals, a first frequency setting unit that sets a first frequency of the clock signals used for a boosting operation period during which the boosting circuit boosts the supply voltage up to the predetermined voltage, a second frequency setting unit that sets a second frequency of the clock signals used for a stable operation period during which the boosting circuit outputs the predetermined voltage after the boosting operation period, a selector that selects the first frequency setting unit or the second frequency setting unit according to the boosting operation period or the stable operation period of the boosting circuit, and a frequency varying unit that alters the frequency of the clock signals to the first frequency or the second frequency during the boosting operation period or the stable operation period of the boosting circuit after the first frequency setting unit or the second frequency setting unit is selected by the selector according to the boosting operation period or the stable operation period.

The transistors include thin-film transistors.

In an exemplary embodiment of the present invention, a voltage boosting circuit includes a boosting circuit that has transistors and that boosts a supply voltage up to a predetermined voltage according to input clock signals, a variable frequency setting unit that sets a variable frequency of the clock signals used for a boosting operation period during which the boosting circuit boosts the supply voltage up to the predetermined voltage, a fixed frequency setting unit that sets a fixed frequency of the clock signals used for a stable operation period during which the boosting circuit outputs the predetermined voltage after the boosting operation period a selector that selects the variable frequency setting unit or the fixed frequency setting unit according to the boosting operation period or the stable operation period of the boosting circuit, and a frequency varying unit that alters the frequency of the clock signals to the variable frequency or the fixed frequency during the boosting operation period or the stable operation period of the boosting circuit after the variable frequency setting unit or the fixed frequency setting unit is selected by the selector according to the boosting operation period or the stable operation period.

The transistors include thin-film transistors.

In an exemplary embodiment of the present invention a voltage boosting circuit includes a boosting circuit that incorporates transistors and that boosts a supply voltage up to a predetermined voltage according to input clock signals, a detector that detects an output voltage value of the boosting circuit, compares the detected voltage value with a threshold value, and outputs results obtained by comparing the detected voltage value with the threshold values and a frequency varying unit that alters a frequency of the clock signals during an operation of the boosting circuit according to the comparison results.

The threshold value is set according to the predetermined voltage output from the boosting circuit.

The transistors include thin-film transistors.

In an exemplary embodiment of the present invention, a voltage boosting circuit includes a boosting circuit that has transistors and that boosts a supply voltage up to a predetermined voltage according to input clock signals, a detector that detects an output voltage of the boosting circuit, a variable frequency setting unit that sets a variable frequency of the clock signals used for a boosting operation period during which the boosting circuit boosts the supply voltage up to the predetermined voltage, a fixed frequency setting unit that sets a fixed frequency of the clock signals used for a stable operation period during which the boosting circuit outputs the predetermined voltage after the boosting operation period a selector that selects the variable frequency setting unit or the fixed frequency setting unit according to values of the output voltage detected by the detector, and a frequency varying unit that alters the frequency of the clock signals to the variable frequency or the fixed frequency during the boosting operation period or the stable operation period of the boosting circuit after the variable frequency setting unit or the fixed frequency setting unit is selected by the selector according to the values of the output voltage detected by the detector.

The transistors may include thin-film transistors.

In an exemplary embodiment of the present invention, a voltage boosting/dropping circuit includes a boosting/dropping circuit that includes transistors and boosts and drops a supply voltage up to a predetermined voltage according to input clock signals, and a frequency varying unit that alters a frequency of the clock signals according to an output voltage during a boosting operation period or a dropping operation period of the boosting/dropping circuit, in which the clock signals are used for the boosting operation period, during which the boosting/dropping circuit boosts the supply voltage up to the predetermined voltage, or the dropping operation period during which the boosting/dropping circuit drops the supply voltage down to the predetermined voltage.

The transistors include thin-film transistors, and the frequency varying unit includes a ring oscillator.

BRIEF DESCRIPTION OF THE DRAWINGS

Exemplary embodiments of the present invention will be understood in more detail from the following descriptions taken in conjunction with the accompanying drawings wherein.

DESCRIPTION OF EXEMPLARY EMBODIMENTS

A voltage boosting circuit according to an exemplary embodiment of the present invention will be described in detail with reference to the accompanying drawings.

Figure 1:
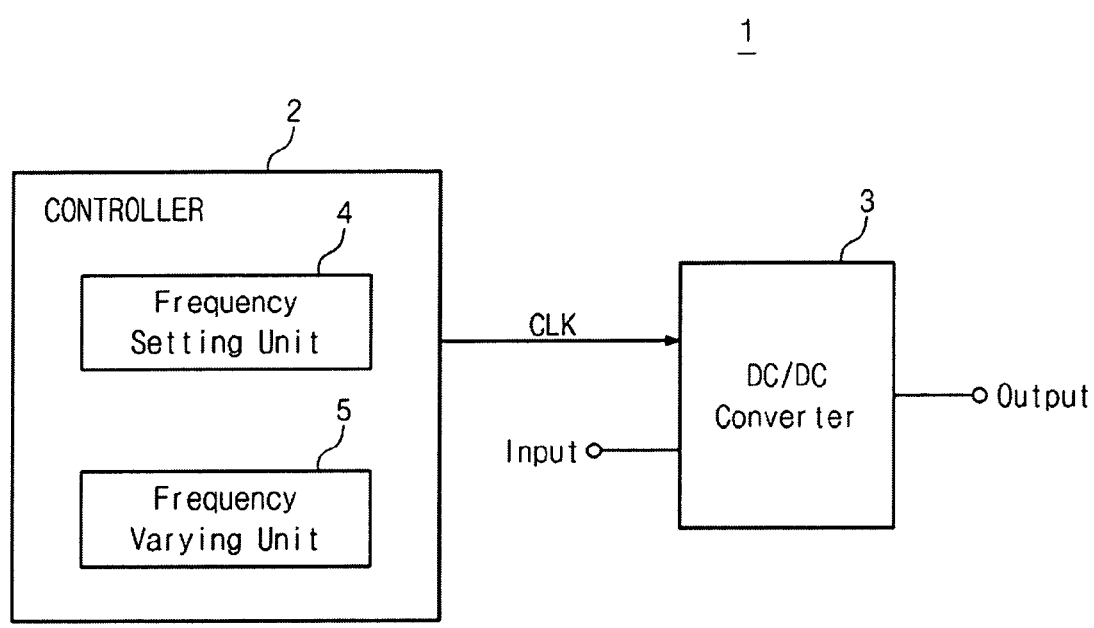
FIG. 1 is a block diagram showing the construction of a voltage boosting circuit according to an exemplary embodiment of the present invention.
Figure 2:
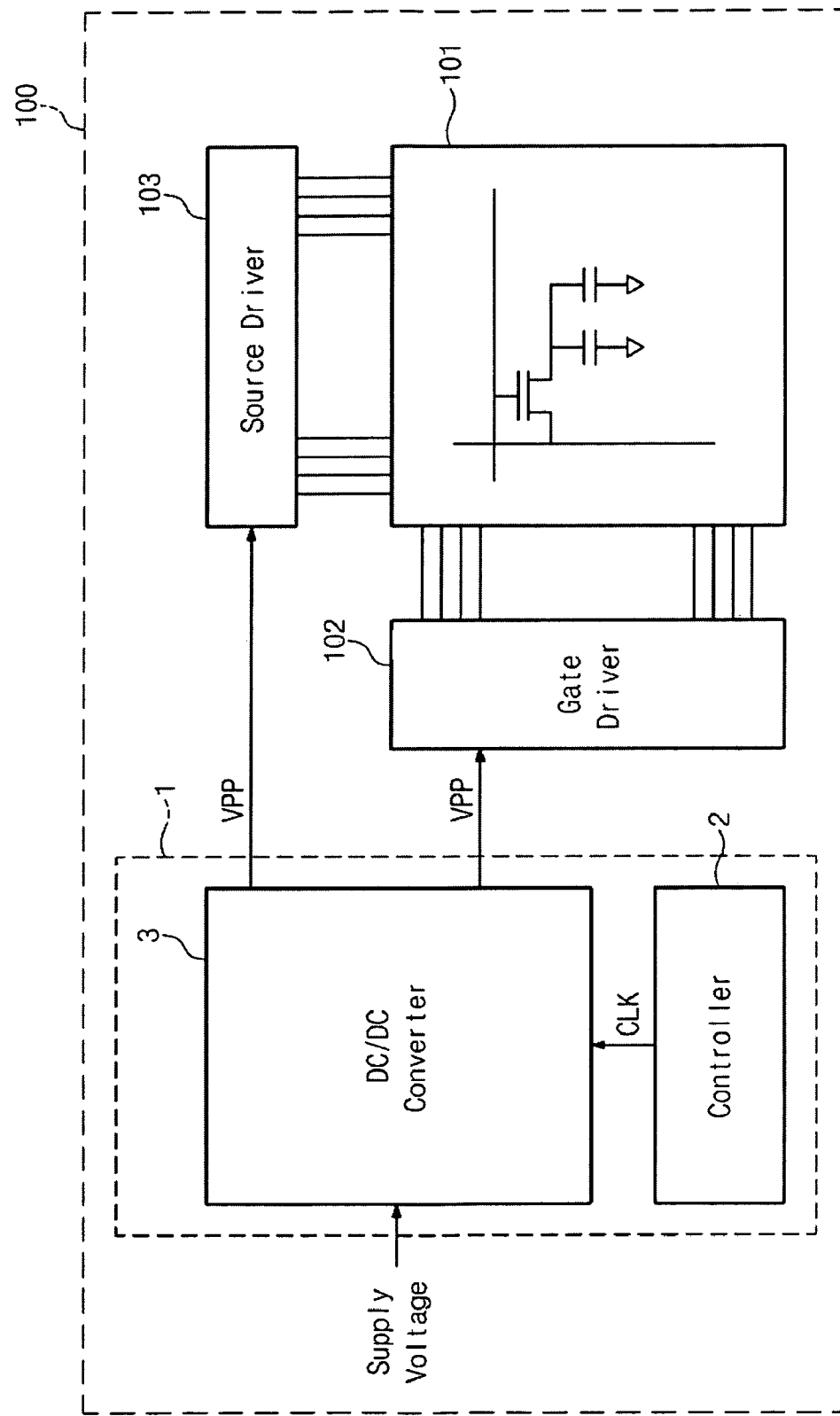
FIG. 2 is a block diagram showing the construction of an LCD employing the voltage boosting circuit of FIG. 1.

FIG. 1 is a block diagram showing the construction of the voltage boosting circuit according to an exemplary embodiment of the present invention, FIG. 2 is a block diagram showing the construction of an LCD employing a voltage boosting circuit such as shown in FIG. 1. As illustrated in FIG. 1, the voltage boosting circuit 1 includes a controller 2 and a DC-DC converter 3. Further, the voltage boosting circuit 1 in accordance with the exemplary embodiment may be provided in an LCD module 100 having a TFT (thin-film transistor) liquid crystal panel shown in FIG. 2.

The LCD module 100 shown in FIG. 2 includes the TFT liquid crystal panel 101, a gate driver 102, a source driver 103, and the voltage boosting circuit 1. The TFT liquid crystal panel 101 is a low-temperature polysilicon TFT liquid crystal panel formed on a glass substrate. The gate driver 102, the source driver 103 and the voltage boosting circuit 1 are also formed on the same glass substrate using a low-temperature polysilicon TFT. The LCD module 100 in accordance with the exemplary embodiment may be used as a small-medium LCD module mounted in electronic appliances, such as portable cell phones and personal computers.

The LCD module 100 includes the TFT liquid crystal panel 101, the gate driver 102, the source driver 103, and the voltage boosting circuit 1, and displays a predetermined image provided from an external graphic controller (not shown).

The controller 2 includes a frequency setting unit 4 and a frequency varying unit 5. The controller 2 outputs clock signals CLK generated by the frequency setting unit 4 and the frequency varying unit 5 to the DC-DC converter 3, thereby controlling the boosting operation of the DC-DC converter 3.

The frequency setting unit 4 stores a frequency setting table in which the frequencies of the clock signals controlling the boosting operation of the DC-DC converter 3 are set corresponding to a predetermined boosting operation period. The boosting operation period is maintained until an external supply voltage (input) is boosted up to a predetermined voltage (Output) after the DC-DC converter 3 starts to operate. In the frequency setting table, operation timings correspond to frequencies such that the frequencies of the clock signals used for the boosting operation period are gradually increased during the boosting operation period.

The frequency varying unit 5 reads the frequency of each operation timing, which is previously set in the frequency setting table of the frequency setting unit 4, to generate the clock signals CLK, and outputs the generated clock signals CLK to the DC-DC converter 3 during the boosting operation period under the control of the controller 2, thereby variably controlling the frequencies of clock signals CLK input during the boosting operation period of the DC-DC converter 3.

Figure 3:
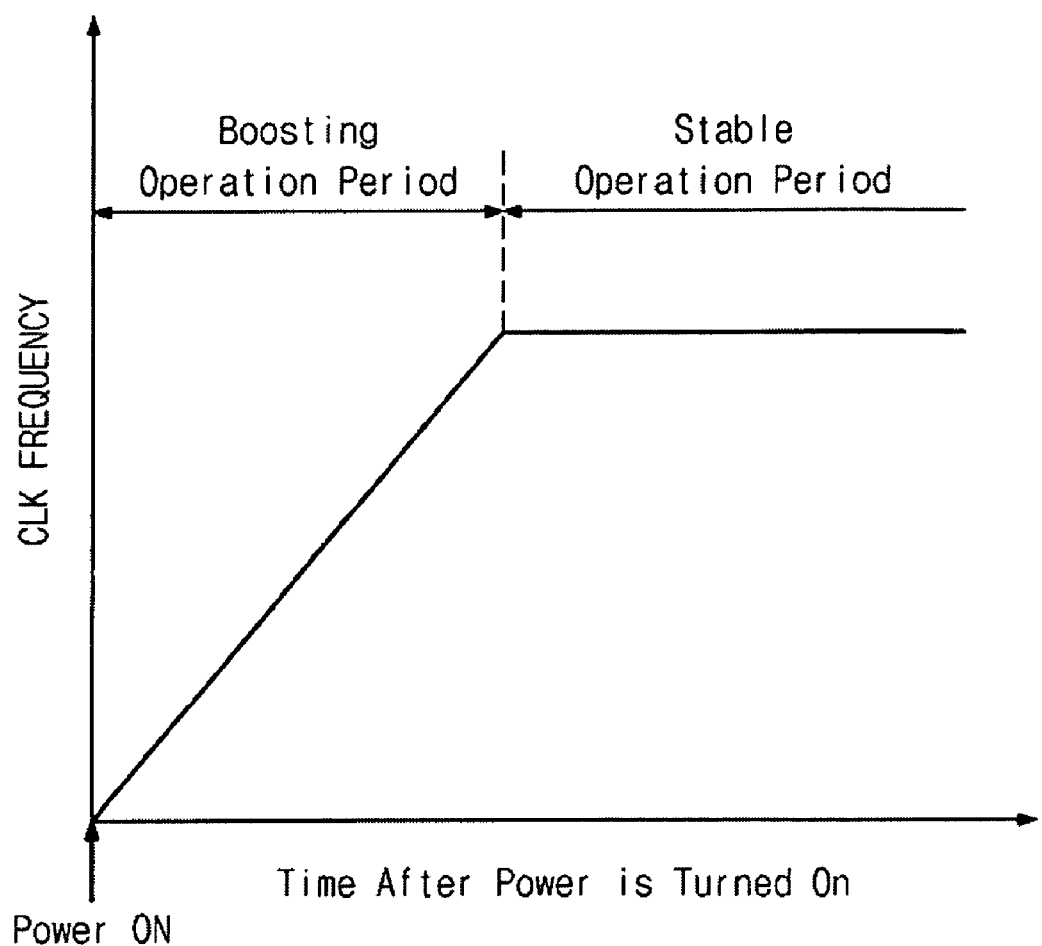
FIG. 3 is a graph showing one example of setting a frequency of clock signals input to a DC-DC converter as shown in FIG. 1.
Figure 4:
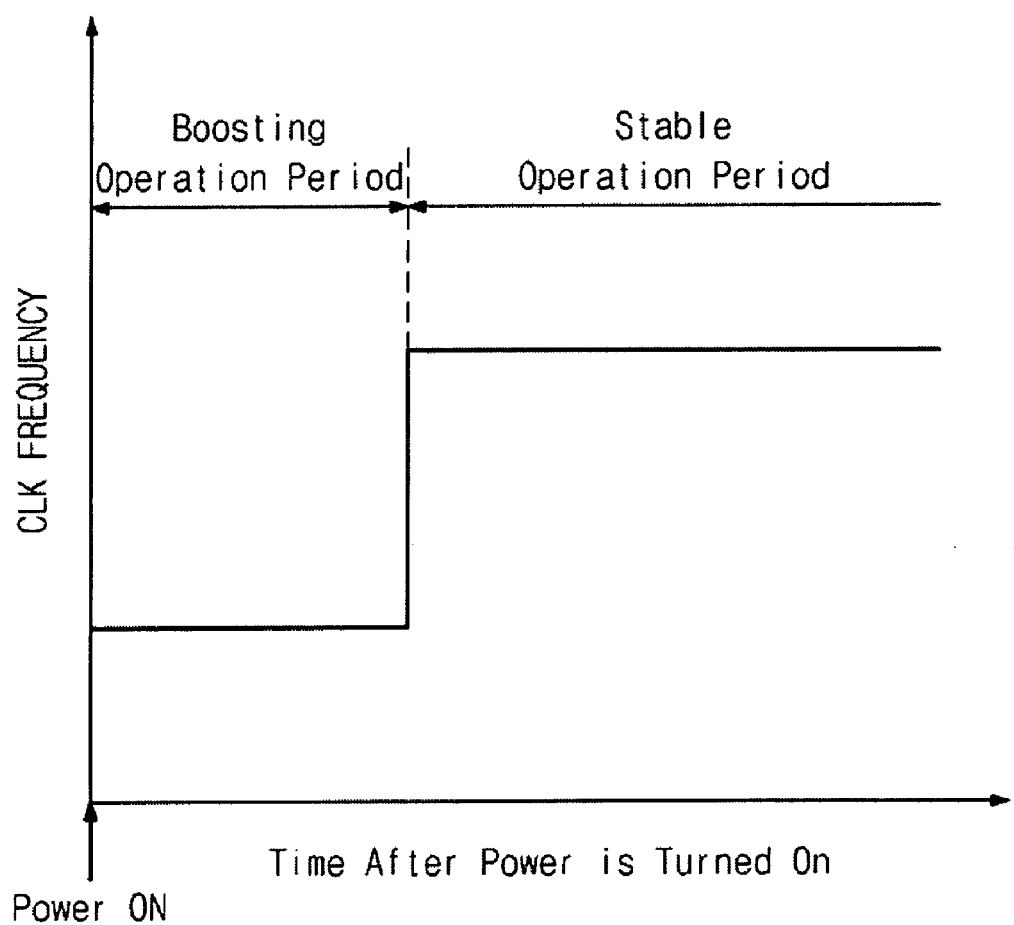
FIG. 4 is a graph showing one example of setting a frequency of clock signals input to a DC-DC converter as shown in FIG. 1.
Figure 5:
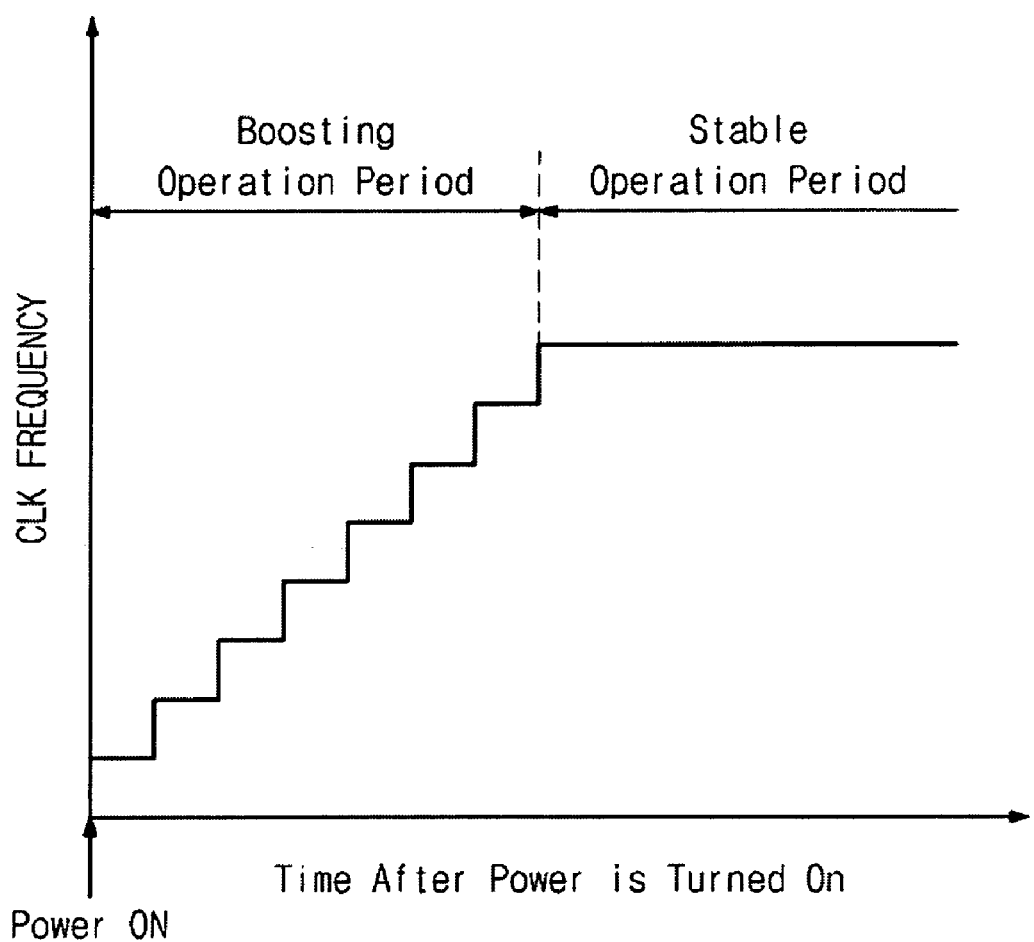
FIG. 5 is a graph showing one example of setting a frequency of clock signals input to a DC-DC converter as shown in FIG. 1.

Clock frequencies are set in the frequency setting table corresponding to predetermined operation timings to variably control the frequencies of the clock signals CLK input during the boosting operation period of the DC-DC converter 3. FIGS. 3 to 5 show examples in which the frequencies are set in the frequency setting table corresponding to the operation timings.

FIG. 3 shows an example of setting frequencies in multiple steps corresponding to the operation timings of short periods such that the clock frequencies CLK exhibit linear changes during the boosting operation period of the DC-DC converter 3 that is maintained until the stable operation is obtained after the power is turned on.

FIG. 4 shows an example of setting a clock frequency in two steps that is, a first clock frequency corresponding to the operation timing when the power is turned on, and a second clock frequency corresponding to the operation timing when the DC-DC converter 3 performs a stable operation, that is, entering the stable operation period after the boosting operation period.

FIG. 5 shows an example of setting clock frequencies in multiple steps according to the operation timings of each predetermined period, which is longer than the operation period of FIG. 3, during the boosting operation period that is maintained until the stable operation period is achieved after the power is turned on. In FIGS. 3 to 5, the time shown in the horizontal axis is on the order of milliseconds, and the clock frequency shown in the vertical axis is on the order of kHz to MHz.

The DC-DC converter 3 of FIG. 2 boosts the external supply voltage up to a predetermined voltage according to the frequency setting of the clock signals CLK input from the controller 2 during the boosting operation period and the stable operation period, and outputs the predetermined voltage to the gate driver 102 and the source driver 103 through the output terminal of the DC-DC converter 3.

Hereinafter, the operation of the voltage boosting circuit 1 according to an exemplary embodiment will be described.

The operation when the power is turned on of the DC-DC converter 3, which is formed on the glass substrate using the low-temperature polysilicon TFT will be described. When the power is turned on, because the output voltage of the DC-DC converter 3 is low, the ON current of the TFT is small, and the propagation delay time between circuit devices is long, the frequency of the clock signals is set to a low level such that the clock signals CLK may be transmitted from the controller 2 to the DC-DC converter 3. As shown in the frequency setting graphs of FIGS. 3 to 5, the frequency of the clock signals is set to a low level when the power is turned on. Then, the output voltage of the DC-DC converter 3 is gradually increased during the boosting operation period, the ON current of the TFT is gradually increased, and the propagation delay time between circuit devices is shortened. Accordingly, in the frequency setting graphs shown in FIGS. 3 to 5, the frequency of the clock signals, which are used during the period corresponding to the boosting operation period, is set such that the frequency may be gradually increased. After the DOC-DC converter 3 boosts the supply voltage up to the predetermined voltage, the DC-DC converter 3 enters the stable operation period following the boosting operation period. Accordingly, the predetermined voltage VPP boosted from the supply voltage is provided to the gate driver 102 and the source driver 103 from the DC-DC converter 3.

The operation of the voltage boosting circuit 1 corresponding to the frequency setting graph shown in FIG. 3 will be described. When the power is turned on, because the output voltage of the DC-DC converter 3 is low and the ON current of the TFT is small, the frequency is set to a low level when the power is turned on such that the clock signals CLK may be transmitted from the controller 2 to the DC-DC converter 3. That is, as shown in FIG. 3, when the power is turned on, the frequency is set to a low level in the frequency setting table of the frequency setting unit 4. Then, the frequency varying unit 5 generates the clock signals CLK based on the frequency when the power is turned on, which has been set in the frequency setting table. The controller 2 outputs the clock signals CLK generated by the frequency varying unit 5 to the DC-DC converter 3.

As the output voltage of the DC-DC converter 3 is gradually increased during the boosting operation period of the DC-DC converter 3, the frequency of the clock signals is gradually increased (see FIG. 3). Then, as the output voltage becomes the predetermined voltage and is saturated, that is, as the stable operation period is achieved, the frequency of the clock signals is fixed (see FIG. 3) That is, as shown in FIG. 3, the frequency of the clock signals is set in the frequency setting table in such a manner that the frequency is gradually increased during the boosting operation period of the DC-DC converter 3 according to the passage of time after the power is turned on, and then the frequency of the clock signals is fixed during the stable operation period. Then, the frequency varying unit 5 sequentially generates the clock signals CLK based on the frequency set in the frequency setting table corresponding to each operation timing of each predetermined period according to the passage of time after the power is turned on. The controller 2 sequentially outputs the clock signals CLK sequentially generated by the frequency varying unit 5 to the DC-DC converter 3. Then, the frequency varying unit 5 generates the clock signals CLK based on the frequency corresponding to the output voltage saturation period, that is, the stable operation period, which is set in the frequency setting table. Further, the controller 2 outputs the clock signals CLK generated by the frequency varying unit 5 to the DC-DC converter 3.

In FIG. 4, the frequency of the clock signals is set in the frequency setting table of the frequency setting unit 4 in such a manner that the frequency is set to a low level, which is higher than the frequency at the time the power is turned on, when the power is turned on, the frequency is increased, and then held constant during the stable operation period. In such a case, the frequency of the clock signals CLK output to the DC-DC converter 3 is set in two steps.

In FIG. 5, the frequency of the clock signals is set in the frequency setting table of the frequency setting unit 4 in such a manner that the frequency is set to a low level, which corresponds to an intermediate frequency between the frequency when the power is turned on in FIG. 3 and the frequency when the power is turned on in FIG. 4, when the power is turned on. Then, the frequency is gradually increased in each predetermined operation period during the boosting operation period and is significantly increased and then maintained constant during the stable operation period. In such a case, the frequency of the clock signals output during the boosting operation period of the DC-DC converter 3 is set in multiple steps.

As described above, the voltage boosting circuit 1 of the exemplary embodiment performs variable frequency control for gradually increasing the frequency of the clock signals CLK during the boosting operation period of the DC-DC converter 3 for which the low output voltage of the DC-DC converter 3 upon the power-on is boosted up to the predetermined voltage. Accordingly, the operation of the DC-DC converter 3 may be stabilized until the DC-DC converter 3 enters the stable operation period after the DC-DC converter 3 starts to operate.

Further, because the voltage boosting circuit 1 of the exemplary embodiment is formed on the TFT liquid crystal panel using a TFT the following advantages may be obtained. In a conventional DC-DC converter, the DC-DC converter is embedded into an external driver IC instead of the TFT liquid crystal panel. According to the present exemplary embodiment, however, the DC-DC converter is formed on the glass substrate on which the TFT liquid crystal panel is formed, so that the internal pressure of the driver IC may be lowered. In addition, the chip size of the driver IC may be reduced, and the manufacturing cost of the driver IC may also be saved. Because the characteristics of the TFT are deteriorated as compared with a bulk silicon transistor included in an IC chip, however, the variable frequency control of the above-described exemplary embodiment is necessary.

In the examples of the frequency setting graphs shown in FIGS. 3 to 5, the operation timing is set corresponding to the short period (matching with the linear change), the intermediate period (multi-step setting) and the long period (two step setting) during the boosting operation period of the DC-DC converter 3. The present invention, however, is not limited to these periods. That is, the periods may be properly changed according to the boosting operation during the boosting operation period after the DC-DC converter 3 starts to operate. In the case of storing the frequency setting table in a memory such as a RAM, the operation timing at which the frequency of the clock signals CLK is set may be changed according to the capacities of the memory.

According to the above-described exemplary embodiment, the frequency of the clock signals CLK is variably set corresponding to the boosting operation of the DC-DC converter 3 that boosts the supply voltage. In the case of the DC-DC converter that drops the supply voltage, the same operation timing and frequency are set in the frequency setting table represented in the operations shown in FIGS. 3 to 5, so that the variable frequency control may be performed during a dropping operation period.

Furthermore, in the case in which the DC-DC converter boosts or drops the supply voltage, when the boosting operation during the boosting operation period of the boosting circuit in the DC-DC converter is performed in the same manner as that of a dropping operation during the dropping operation period of a dropping circuit, the same operation timing and frequency are set in the frequency setting table for the boosting and dropping operations. Accordingly, the variable frequency control may be performed during the boosting operation period and during the dropping operation period.

Moreover, in the case in which the DC-DC converter boosts or drops the supply voltage, when the boosting operation of the boosting circuit in the DC-DC converter is different from the dropping operation of the dropping circuit, different operation timings and frequencies are set in the frequency setting table for the boosting and dropping operations, respectively. Accordingly, the variable frequency control may also be performed during the boosting operation period and the dropping operation period.

In the above-described exemplary embodiment, the frequency of the clock signals CLK is variably controlled according to the boosting operation during the boosting operation period of the DC-DC converter. In another exemplary embodiment, a self-oscillating ring oscillator is installed and the frequency of the clock signals CLK output from the ring oscillator is variably controlled using the output voltage of the DC-DC converter.

Figure 6:
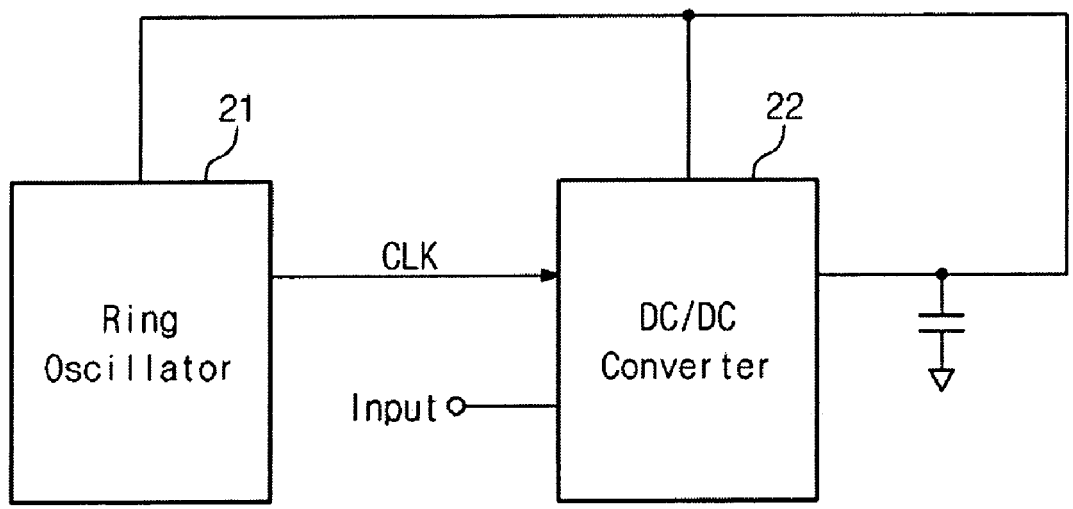
FIG. 6 is a block diagram showing the construction of a voltage boosting circuit according to an exemplary embodiment of the present invention.

FIG. 6 is a block diagram showing the construction of the voltage boosting circuit according to an exemplary embodiment of the present invention. As illustrated in FIG. 6, the voltage boosting circuit 20 includes a ring oscillator 21 and a DC-DC converter 22. Further, the voltage boosting circuit 20 in accordance with the exemplary embodiment is provided in the LCD module 100 having the TFT liquid crystal panel 101, as shown in FIG. 2. The TFT liquid crystal panel 101 is a low-temperature polysilicon TFT liquid crystal panel formed on a glass substrate. Further, the gate driver 102, the source driver 103 and the voltage boosting circuit 20 are also formed on the same glass substrate using a low-temperature polysilicon TFT. The LCD module 100 (not shown in FIG. 6) having the voltage boosting circuit 20 of this exemplary embodiment may be used as a small-medium LCD module mounted in electronic appliances, such as portable cell phones and personal computers.

Figure 7A:
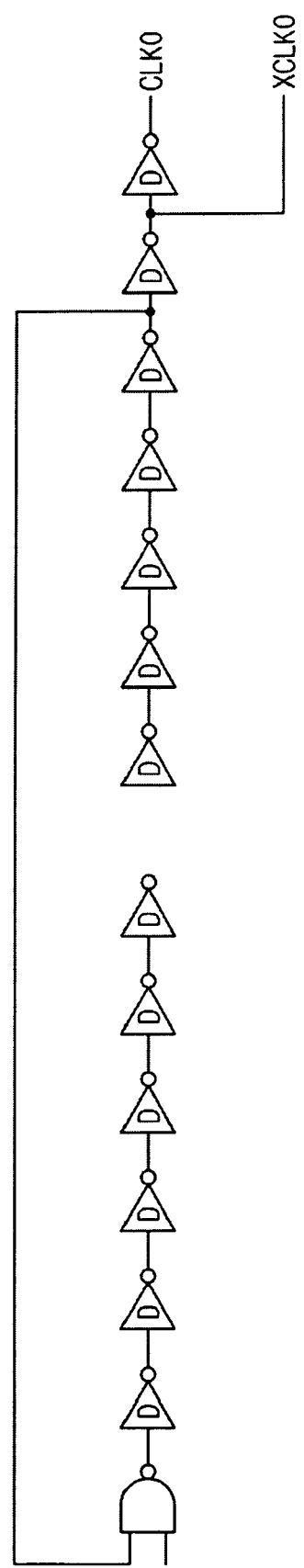
FIG. 7A is a circuit diagram showing the construction of a ring oscillator used in the circuit shown in FIG. 6.
Figure 7B:
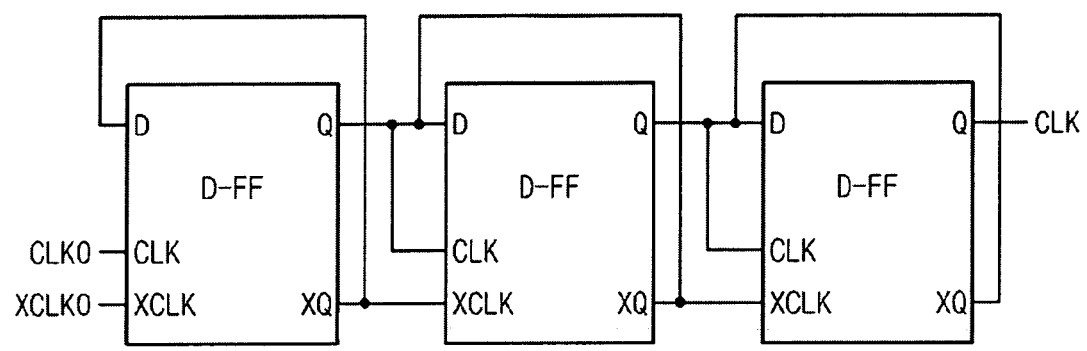
FIG. 7B is a circuit diagram showing the construction of a divider according to an exemplary embodiment of the present invention.

The ring oscillator 21 includes a plurality of inverters serially connected to each other in the known manner, generates clock signals CLK having a predetermined frequency according to an input voltage fed back from an output from the DC-DC converter 22, and outputs the clock signals CLK to the DC-DC converter 22. FIGS. 7A and 7B show an example of the circuit construction of the ring oscillator 21. The ring oscillator 21 includes a ring oscillator circuit 21a shown in FIG. 7A and a divider circuit 21b shown in FIG. 7B.

Referring to FIG. 7A, in the ring oscillator circuit 21a, a NAND gate is disposed at the input of the ring oscillator circuit 21a, twenty inverters D, although not all shown in FIG. 7A, are serially connected to the output terminal of the NAND gate, and the output of the final inverter is fed back and connected to one input terminal of the NAND gate, so that the ring oscillator circuit 21a has an oscillation function as a ring oscillator. Control signals from an external controller (not shown) are input to the other input terminal of the NAND gate, and the operation of the ring oscillator circuit 21a is controlled by those control signals. Further, two inverters D are serially connected to the output terminal of the final inverter, producing the feedback signal and the two inverters respectively output clock signals XCLKO and CLKO from oscillation signals output from the output terminal of the final inverter D. The ring oscillator circuit 21a comes into an operation state or a non-operation state by the control signals input to the other input terminal of the NAND gate. Further, the ring oscillator circuit 21a gradually increases an oscillation frequency according to an increase in the output voltage of the DC-DC converter 22, so that the frequencies of the clock signals XCLKO and CLKO are gradually increased. The number of inverters serially connected to the NAND gate is not specifically limited, and need only satisfy the frequency of the clock signals CLK necessary for the boosting operation of the DC-DC converter 22.

Referring to FIG. 7B, the divider 21b includes three D-FF (flip-flop) circuits serially connected to each other. The ring oscillator circuit 21 generates clock signals CLK, which are output to the DC-DC converter 22, by dividing the clock signals XCLKO and CLKO input to the first D-FF. More specifically, the output Q of the D-flip flop is fed to the input of the next flip flop and the inverted output XQ is fed back to the D input of the D-flip flop.

Figure 8:
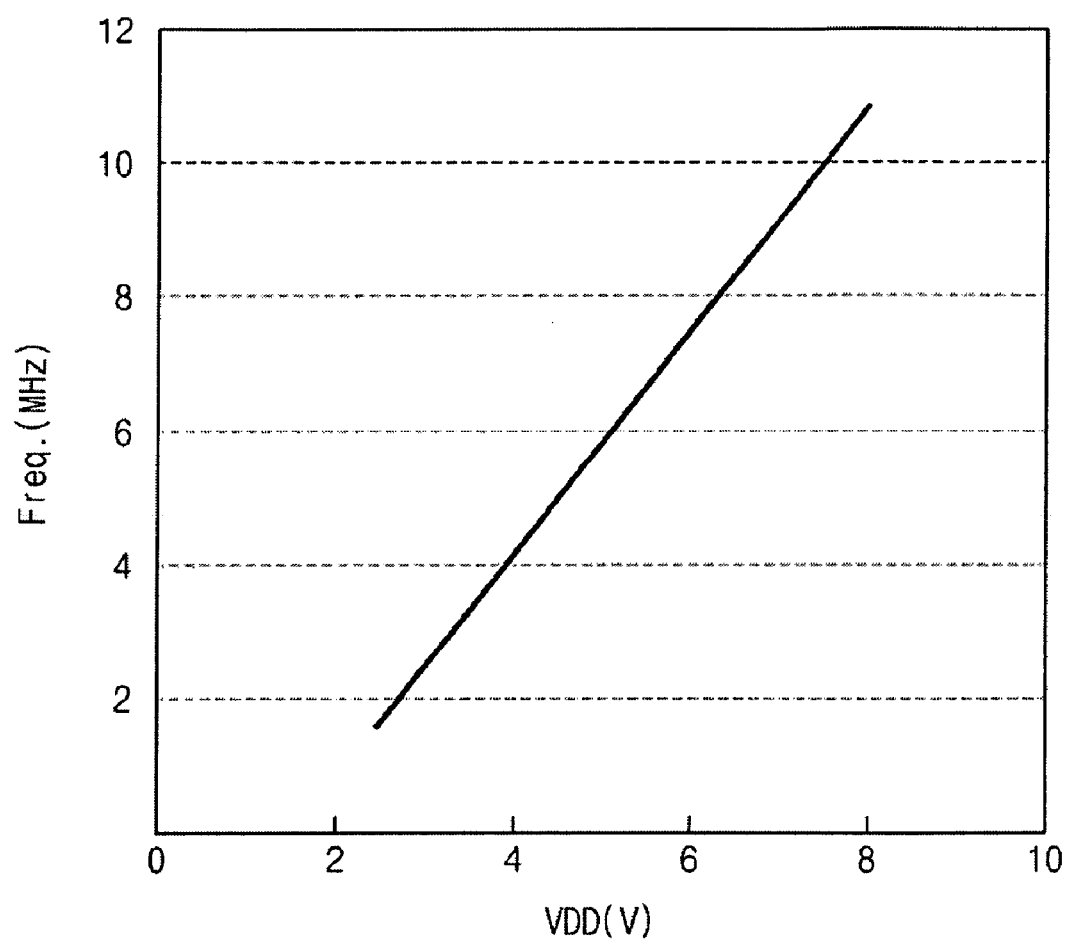
FIG. 8 is a graph showing the voltage-oscillation frequency characteristics of a ring oscillator circuit according to an exemplary embodiment of the present invention.

FIG. 8 is a graph showing the voltage-oscillation frequency characteristics of the ring oscillator circuit 21 used for the above-described exemplary embodiment. As shown in the graph of FIG. 8, the horizontal axis represents supply voltage VDD and the vertical axis represents an oscillation frequency. Further, the ring oscillator 21 increases the supply voltage VDD to increase the oscillation frequency.

Hereinafter, the operation of the voltage boosting circuit 20 according to this exemplary embodiment will be described.

As the voltage boosting circuit 20 of FIG. 6 is powered on and the DC-DC converter 22 operates, low voltage is output from the output terminal of the DC-DC converter 22. That is, when the power is turned on, the output voltage of the DC-DC converter 22 is low. Thus, the ring oscillator circuit 21 a oscillates at a low frequency by the low voltage input fed back from the DC-DC converter 22 output. Then, the divider 21b generates low-frequency clock signals CLK and outputs the low-frequency clock signals CLK to the DC-DC converter 22. As the low frequency clock signals CLK are input from the divider 21b, the output voltage of the DC-DC converter 22 is gradually increased. As the output voltage of the DC-DC converter 22 is gradually increased, the oscillation frequency of the ring oscillator 21 is gradually increased and, thus, the frequency of the clock signals CLK is gradually increased.

The DC-DC converter 22 and the ring oscillator 21 repeat the operations as described above, so that the output voltage of the DC-DC converter 22 is gradually increased during the boosting operation period thereof. Then, the output voltage is boosted up to the predetermined voltage, so the stable operation period is performed. Thus, the predetermined voltage is constantly output. Further, as the output voltage input to the ring oscillator 21 is saturated, the frequency of the clock signals CLK becomes constant.

According to the voltage boosting circuit 20 of the exemplary embodiment as described above, the ring oscillator 21 is connected to the input terminal of the DC-DC converter 22, and the output voltage of the DC-DC converter 22 is feedback to the ring oscillator 21, so that the ring oscillator 21 changes the oscillation frequency based on the output voltage of the DC-DC converter 22. Consequently, the controller circuit that sets the frequency of the clock signals CLK in the initially described exemplary embodiment is not necessary and, thus, the circuit area of the voltage boosting circuit 20 may be reduced.

Further, according to the above-described exemplary embodiment, the ring oscillator is used as a self-oscillator, however, the self-oscillator is not limited to the ring oscillator. That is, a CR oscillator may alternatively be used.

In the above-described exemplary embodiment, the ring oscillator is used for the voltage boosting circuit, however, another exemplary embodiment is characterized in that a ring oscillator is used for a voltage boosting/dropping circuit.

Figure 9:
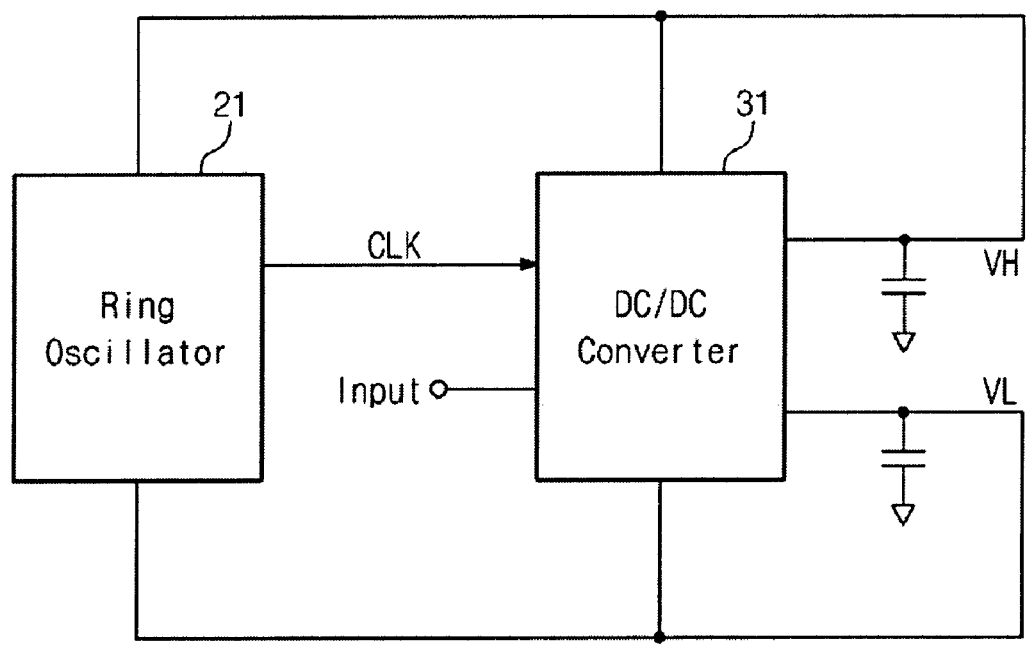
FIG. 9 is a block diagram showing the construction of a voltage boosting circuit according to an exemplary embodiment of the present invention.

FIG. 9 is a block diagram showing the construction of the voltage boosting/dropping circuit according to an exemplary embodiment of the present invention. In FIG. 9, because the same reference numerals are assigned to the elements identical to those of the voltage boosting circuit shown in FIG. 5, a detailed description thereof will be omitted. As illustrated in FIG. 9, the voltage boosting/dropping circuit 30 includes a ring oscillator 21 and a DC-DC converter 31. Further, the voltage boosting/dropping circuit 30 in accordance with the exemplary embodiment of FIG. 9, is provided in the LCD module 100 having the TFT liquid crystal panel 101 as shown in FIG. 2. The TFT liquid crystal panel 101 is a low-temperature polysilicon TFT liquid crystal panel formed on a glass substrate, as in the case of the initially described exemplary embodiment. Further, the gate driver 102, the source driver 103 and the voltage boosting circuit 30 are also formed on the same glass substrate using a low-temperature polysilicon TFT The LCD module 100 shown in FIG. 2 having the voltage boosting/dropping circuit 30 of the above-described exemplary embodiment may be used as a small-medium LCD module mounted in electronic appliances, such as portable cell phones and personal computers.

Figure 10:
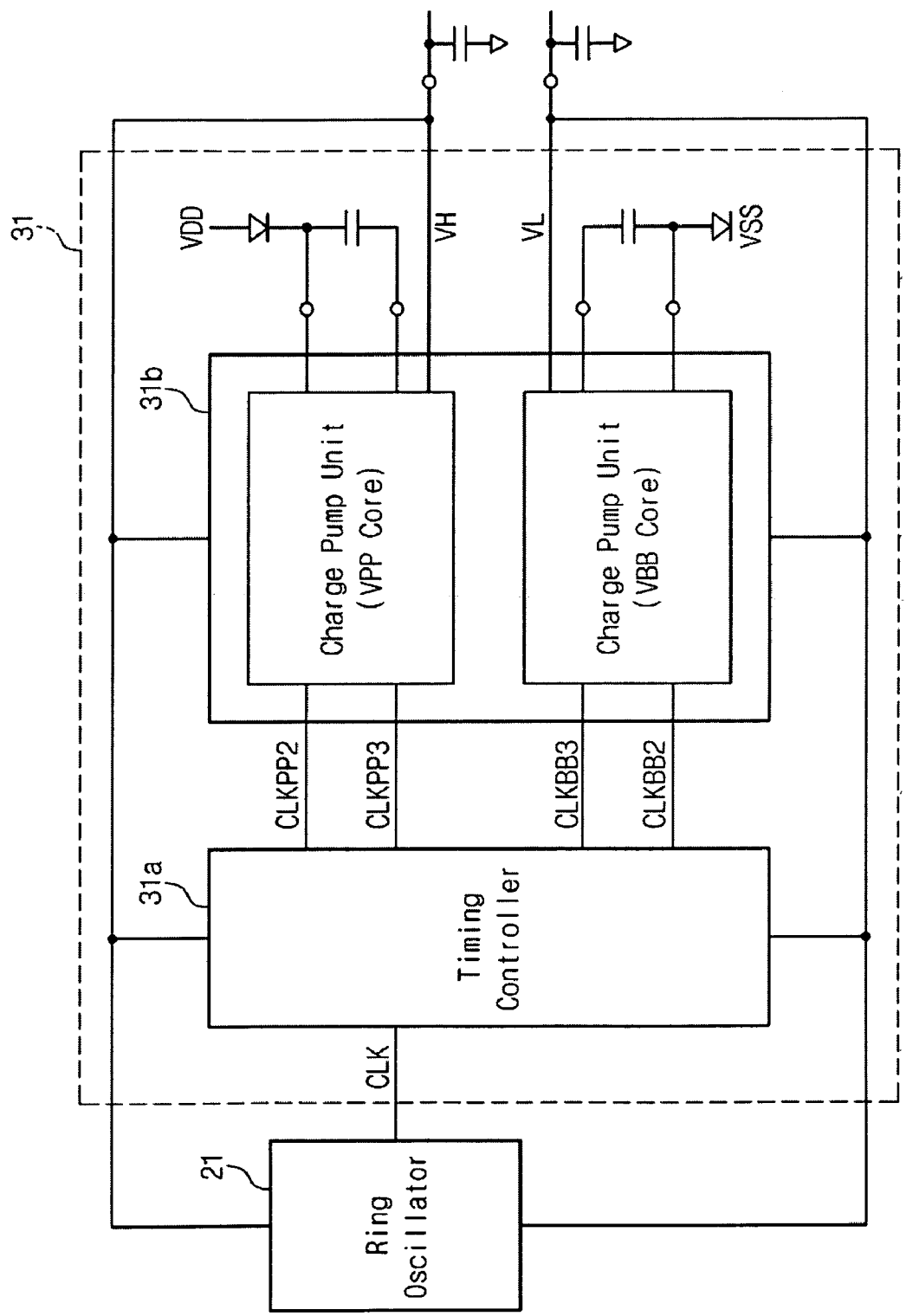
FIG. 10 is a block diagram showing the internal construction of a DC-DC converter according to an exemplary embodiment of the present invention.

FIG. 10 is a block diagram showing the internal construction of the DC-DC converter 31 of FIG. 9. As illustrated in FIG. 10, the DC-DC converter 31 includes a timing controller 31a and a charge pump circuit 31b.

The timing controller 31a generates clock signals CLKPP2, CLKPP3, CLKBB2 and CLKBB3 by using clock signals CLK input from the ring oscillator 21, in which the clock signals CLKPP2, CLKPP3, CLKBB2 and CLKBB3 are input to two charge pump units in the charge pump circuit 31b, respectively.

Figure 11:
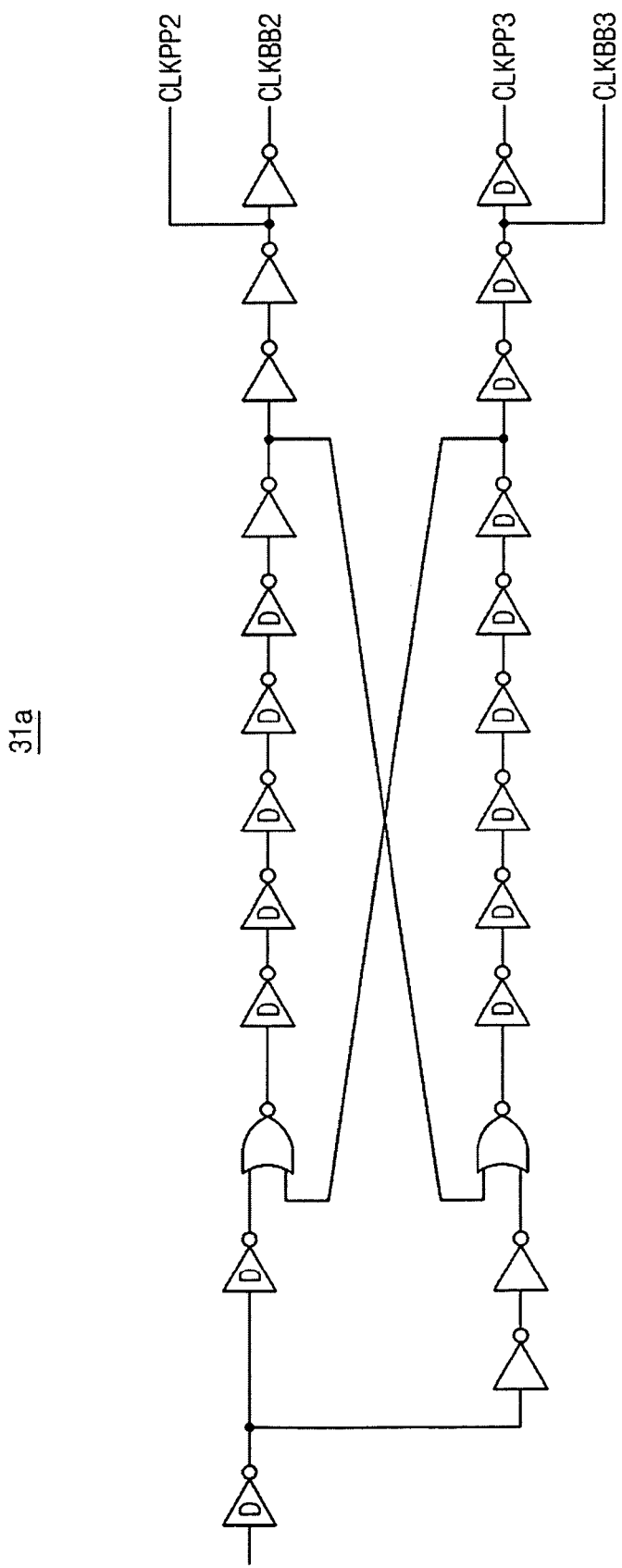
FIG. 11 is a circuit showing the construction of a timing controller according to an exemplary embodiment of the present invention.

FIG. 11 is a circuit diagram showing the construction of the timing controller 31a. As illustrated in FIG. 11, in the timing controller 31a, an inverter D is connected to the input terminal of the timing controller 31a and receives the clock signal CLK from the ring oscillator 21, and a timing adjustment circuit is connected to the output terminal of the input inverter D, in which the timing adjustment circuit includes a plurality of inverters and NOR circuits. Further, four output inverters are connected to the output terminals of the timing adjustment circuit, in which the four output inverters output the clock signals CLKPP2, CLKPP3, CLKBB2 and CLKBB3.

After the timing adjustment circuit of the timing controller 31a receives the clock signals CLK from the ring oscillator 21 the timing adjustment circuit generates first clock signals CLKPP2 and CLKPP3 having an adjusted timing for the boosting charge pump unit (VPP Core), and second clock signals CLKBB2 and CLKBB3 having an adjusted timing for the dropping charge pump unit (VBB Core).

The charge pump circuit 31b includes the boosting and dropping charge pump units. In FIG. 10, the charge pump unit VPP core is a boosting charge pump and the charge pump unit VBB core is a dropping charge pump.

The boosting charge pump unit VPP core performs a boosting operation of input voltage based on the frequencies of the clock signals CLKPP2 and CLKPP3 input from the. The dropping charge pump unit VBB core performs a dropping operation of input voltage based on the frequencies of the clock signals CLKBB2 and CLKBB3 input from the timing controller 31a.

Hereinafter, the operation of the voltage boosting/dropping circuit 30 according to the exemplary embodiment of FIG. 9 will be described.

As the voltage boosting/dropping circuit 30 of FIG. 9 is powered on and the DC-DC converter 31 operates, low voltage is output from the output terminal of the DC-DC converter 31. That is, when the power is turned on, the output voltage of the DC-DC converter 31 is low. Accordingly, the ring oscillator 21 oscillates at a low frequency by a low voltage VH or VL fed back from the boosting charge pump unit output or the dropping charge pump unit output in the DC-DC converter 31, generates low-frequency clock signals CLK, and outputs the low-frequency clock signals CLK to the timing controller 31a.

The timing controller 3ia generates the low-frequency clock signals CLKPP2, CLKPP3 and CLKBB2, CLKBB3 from the low-frequency clock signals CLK input from the ring oscillator 21, and outputs the low frequency clock signals CLKPP2, CLKPP3 and CLKBB2, CLKBB3 to the boosting charge pump unit (VPP Core) and the dropping charge pump unit (VPP Core) in the charge pump circuit 31b, respectively. As the low-frequency clock signals CLKPP2, CLKPP3 and CLKBB2, CLKBB3 are input from the timing controller 31a, the boosting and dropping output voltage VH and VL of the boosting charge pump unit, respectively and the dropping charge pump unit are gradually increased. As the output voltage input from the DC-DC converter 31 is gradually increased, the oscillation frequency of the ring oscillator 21 is gradually increased and, thus, the frequency of the clock signals CLK is gradually increased. As a result, the frequencies of the clock signals CLKPP2 and CLKBB2 are gradually increased. As shown in FIG. 11, the clock signals CLKBB2 and CLKBB3 are the inverse of the clock signals CLKPP2 and CLKPP3, respectively.

The DC-DC converter 31 and the ring oscillator 21 repeat the operation as described above, so that the output voltage of the DC-DC converter 31 is gradually increased during the boosting operation period and decreased during the dropping operation period of the DC-DC converter 31. If the output voltage is increased up to the constant voltage, the stable operation period is performed and the predetermined voltages VH and VL are constantly output. Accordingly, the output voltage input to the ring oscillator 21 is also saturated, so that the frequency of the clock signals CLK becomes constant and, thus, the frequencies of the clock signals CLKPP2, CLKPP3 and CLKBB2, CLKBB3 also become constant.

According to the voltage boosting/dropping circuit 30 of the exemplary embodiment shown in FIG. 9 as described above, the ring oscillator 21 is connected to the input terminal of the DC-DC converter 31, and the output voltage of the DC-DC converter 31 is fedback to the ring oscillator 21, so that the ring oscillator 21 changes the oscillation frequency based on the output voltage of the DC-DC converter 31. Consequently, the control circuit that sets the frequency of the clock signals CLK in the initially described exemplary embodiment is not necessary and, thus, the circuit area of the voltage boosting/dropping circuit 30 may be reduced.

Further, according to the above-described exemplary embodiment, the ring oscillator is used as a self-oscillator, however, the self-oscillator is not limited to the ring oscillator. That is, a CR oscillator may alternatively be used as the self-oscillator.

In the initially described exemplary embodiment, the frequency of the clock signals CLK is variably controlled according to the boosting operation during the boosting operation period of the DC-DC converter. Another exemplary embodiment, however, uses first and second frequency setting units that set the frequency of the clock signals CLK according to the boosting and stable operations of the DC-DC converter.

Figure 12:
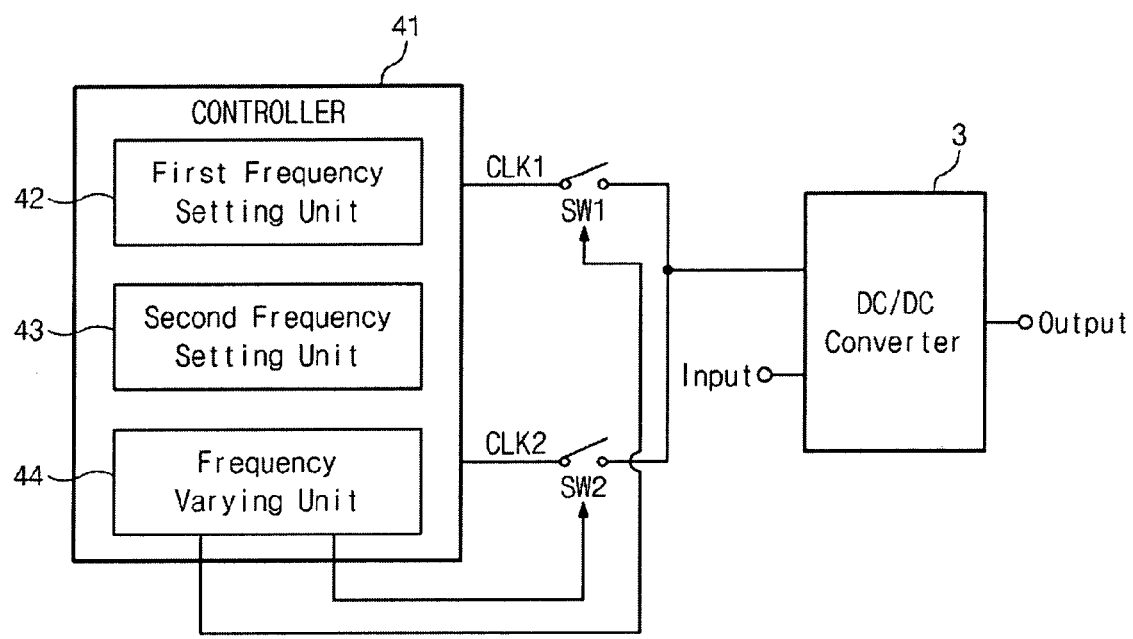
FIG. 12 is a block diagram showing the construction of a voltage boosting circuit according to an exemplary embodiment of the present invention.

FIG. 12 is a block diagram showing the construction of the voltage boosting circuit according to an exemplary embodiment of the present invention. In FIG. 12, because the same reference numerals are assigned to the elements identical to those of the voltage boosting circuit shown in FIG. 1 according to the initially described exemplary embodiment, a detailed description thereof will be omitted. As illustrated in FIG. 12, the voltage boosting circuit 40 includes a controller 41, switches SW1 and SW2 and a DC-DC converter 3. Further, the voltage boosting circuit 40 in accordance with this exemplary embodiment can be provided in the LCD module 100 having the TFT liquid crystal panel 101, as shown in FIG. 2. The TFT liquid crystal panel 101 is a low-temperature polysilicon TFT liquid crystal panel formed on a glass substrate, as in the case of the initially described exemplary embodiment. Further, the gate driver 102, the source driver 103 and the voltage boosting circuit 40 are also formed on the same glass substrate using a low-temperature polysilicon TFT. The LCD module 100 shown in FIG. 2 having the voltage boosting circuit 40 of the above-described exemplary embodiment may be used as a small-medium LCD module mounted in electronic appliances, such as portable cell phones and personal computers.

The controller 41 includes a first frequency setting unit 42, a second frequency setting unit 43, and a frequency varying unit 44. The frequency varying unit 44 of the controller 41 turns on the switch SW1 or SW2 at each timing according to the boosting and stable operations of the DC-DC converter 3, and outputs clock signals CLK1 or CLK2 generated by the first and second frequency setting units 42 and 43, and the frequency varying unit 44 to the DC-DC converter 3, thereby controlling the boosting and stable operations of the DC-DC converter 3.

The first frequency setting unit 42 sets the first frequency of the clock signals CLK1 used for the boosting operation during the boosting operation period of the DC-DC converter 3. More specifically, the first frequency setting unit 42 sets the first frequency, which corresponds to the boosting operation period based on the boosting operation during the boosting operation period for which the output voltage is gradually increased after the power is turned on.

The second frequency setting unit 43 sets the second frequency of the clock signals CLK2 used for the stable operation during the stable operation period of the DC-DC converter 3. The second frequency setting unit 43 sets the second frequency, which corresponds to the stable operation period, based on the stable operation during the stable operation period after the boosting operation period.

The frequency varying unit 44 reads the first frequency of the clock signals CLK1 or the second frequency of the clock signals CLK2, which are set by the first frequency setting unit 42 and the second frequency setting unit 43, respectively to generate the clock signals CLK1 and CLK2, and outputs the generated clock signals CLK1 and CLK2 to the DC-DC converter 3 through switches SW1 and SW2 under the control of the frequency varying unit 44, thereby variably controlling the frequency of the clock signals input for the boosting and stable operations of the DC-DC converter 3.

The frequency setting for the first and second frequencies corresponds to the frequency setting shown in FIG. 4 according to the initially described exemplary embodiment. That is, two-step frequency setting is achieved, in which the first frequency is set corresponding to the operation timing when the power is turned on and the second frequency is set corresponding to the operation timing during the stable operation period after the boosting operation period.

Hereinafter, the operation of the voltage boosting circuit 40 according to this exemplary embodiment will be described.

When the power is turned on, because the output voltage of the DC-DC converter 3 is low, the ON current of the TFT is small, and the propagation delay time between circuit devices is long, the frequency of the clock signals is set to a low level such that the clock signals CLK may be transmitted to the DC-DC converter 3 from the controller 41. That is, as illustrated in FIG. 4, the first frequency setting unit 42 sets the first frequency corresponding to the frequency when the power is turned on. The frequency varying unit 44 generates the clock signals CLK1 based on the first frequency set by the first frequency setting unit 42. The controller 41, using the frequency varying unit 44, turns on the switch SW1 and outputs the clock signals CLK1 generated by the frequency varying unit 44 to the DC-DC converter 3.

Next, the frequency varying unit 44 reads the second frequency from the second frequency setting unit 43 at the operating timing at which the DC-DC converter 3 enters the stable operation period after the boosting operation period, and turns on the switch SW2 and outputs the clock signals CLK2 to the DC-DC converter 3.

According to the voltage boosting circuit 40 of this exemplary embodiment as described above, the variable frequency control is performed by increasing the frequency of the clock signals from the first low frequency to the second high frequency during the boosting operation period, in which the low output voltage of the DC-DC converter 3 gradually increases and reaches the predetermined voltage, and during the stable operation period which is performed after the boosting operation period. Consequently, because the frequency of the clock signals may be set according to the boosting operation and the stable operation of the DC-DC converter 3, the operation of the DC-DC converter 3 may be stabilized until the DC-DC converter 3 enters the stable operation period after the boosting operation period.

In the above-described exemplary embodiment, the frequency of the clock signals CLK is variably controlled through two steps according to the boosting and stable operations of the DC-DC converter. Another exemplary embodiment, however, uses variable and fixed frequency setting units that set the frequency of the clock signals CLK according to boosting and stable operations of the DC-DC converter.

Figure 13:
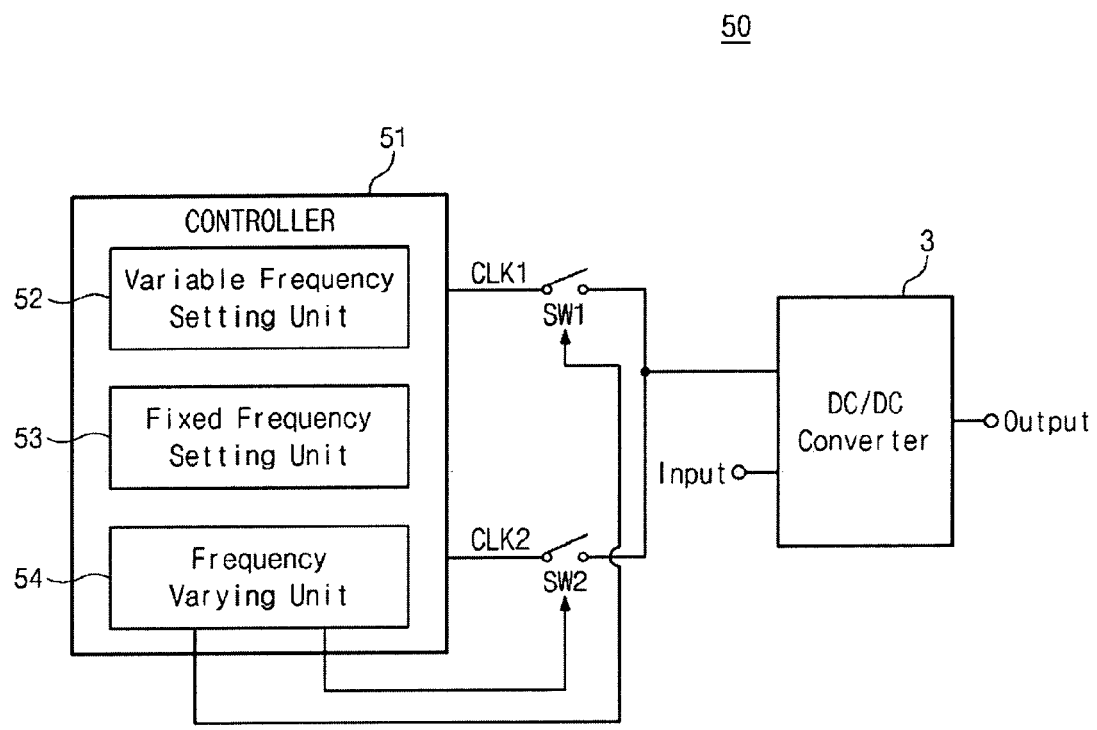
FIG. 13 is a block diagram showing the construction of a voltage boosting circuit according to an exemplary embodiment of the present invention.

FIG. 13 is a block diagram showing the construction of the voltage boosting circuit according to an exemplary embodiment of the present invention. In FIG. 13, because the same reference numerals are assigned to the elements identical to those of the voltage boosting circuit shown in FIG. 1 according to the initially described exemplary embodiment, a detailed description thereof will be omitted. As illustrated in FIG. 13, the voltage boosting circuit 50 includes a controller 51, switches SW1 and SW2, and a DC-DC converter 3. Further, the voltage boosting circuit 50 in accordance with this exemplary embodiment can be provided in the LCD module 100 having the TFT liquid crystal panel 101 as shown in FIG. 2. The TFT liquid crystal panel 101 is a low-temperature polysilicon TFT liquid crystal panel formed on a glass substrate as. In the case of the initially described exemplary embodiment. Further, the gate driver 102, the source driver 103, shown in FIG. 2, and the voltage boosting circuit 50 are also formed on the same glass substrate using a low-temperature polysilicon TFT. The LCD module 100 shown in FIG. 2 having the voltage boosting circuit 50 of this exemplary embodiment may be used as a small-medium LCD module mounted in electronic appliances, such as portable cell phones and personal computers.

The controller 51 includes a variable frequency setting unit 52, a fixed frequency setting unit 53, and a frequency varying unit 54. The controller 51, using the frequency varying unit 54, turns on the switch SW1 or SW2 at each timing according to the boosting and stable operations of the DC-DC converter 3, and outputs clock signals CLK1 or CLK2 generated by the variable frequency setting unit 52, the fixed frequency setting unit 53, and the frequency varying unit 54 to the DC-DC converter 3, thereby controlling the boosting and stable operations of the DC-DC converter 3.

The variable frequency setting unit 52 sets frequencies in order to variably control the frequency of the clock signals CLK at a predetermined operation timing, in which the clock signals CLK are used for the boosting operation during the boosting operation period of the DC-DC converter 3. More specifically, the variable frequency setting unit 52 sets the frequencies, which correspond to the boosting operation period, based on the boosting operation during the boosting operation period for which the output voltage of the DC-DC converter 3 is gradually increased after the power is turned on.

The fixed frequency setting unit 53 sets the fixed frequency of the clock signals CLK used for the stable operation during the stable operation period of the DC-DC converter 3. The fixed frequency setting unit 53 sets the fixed frequency, which corresponds to the stable operation period, based on the stable operation during the stable operation period after the boosting operation period.

The frequency varying unit 54 reads the variable frequency and the fixed frequency, which are set by the variable frequency setting unit 52 and the fixed frequency setting unit 53, to generate clock signals CLK1 and CLK2, and outputs the generated clock signals CLK1 and CLK2 to the DC-DC converter 3 by controlling the switches SW1 and SW2 thereby variably controlling the frequency of the clock signals input for the boosting and stable operations of the DC-DC converter 3.

The frequency setting for the variable frequency and the fixed frequency corresponds to that of FIG. 3 according to the initially described exemplary embodiment. That is, during the boosting operation period in which the supply voltage is gradually boosted after the power is turned on, the frequencies are set corresponding to predetermined operation timings. In addition, the fixed frequency is set corresponding to the operation timing when the stable operation period is performed after the boosting operation.

Hereinafter, the operation of the voltage boosting circuit 50 according to this exemplary embodiment will be described.

When the power is turned on, because the output voltage of the DC-DC converter 3 is low, the ON current of the TFT is small, and the propagation delay time between circuit devices is long, the frequency of the clock signals is set to a low level such that the clock signals CLK may be transmitted to the DC-DC converter 3 from the controller 51. That is, as illustrated in FIG. 3, the variable frequency setting unit 52 sets the frequency to a low level when the power is turned on. The frequency varying unit 54 generates the clock signals CLK1 based on the low frequency set by the variable frequency setting unit 52. The controller 51 turns on the switch SW1 and outputs the clock signals CLK1 generated by the frequency varying unit 54 to the DC-DC converter 3.

As the output voltage of the DC-DC converter 3 is gradually increased, the frequency varying unit 54 gradually increases the frequency of the clock signals CLK1 based on each frequency which is set in the variable frequency setting unit 52 with operation timings having a predetermined interval. In the state in which the switch SW1 is turned on, the controller 51 sequentially outputs the clock signals CLK1 sequentially generated by the frequency varying unit 54 to the DC-DC converter 3. If the stable operation period for which the predetermined voltage boosted from the supply voltage is constantly output, is performed after the boosting operation period, the frequency varying unit 54 generates the clock signals CLK2 based on the fixed frequency set by the fixed frequency setting unit 53. Then, the frequency varying unit 54 generates the clock signals CLK2 based on the frequency for the stable operation period, which is set by the fixed frequency setting unit 53. The controller 51, using the frequency varying unit 54, turns off the switch SW1 and turns on the switch SW2, so the clock signals CLK2 generated by the frequency varying unit 54 are output to the DC-DC converter 3.

According to the voltage boosting circuit 50 of the exemplary embodiment as described above the variable frequency control is performed using the variable frequency setting unit 52, which increases the frequency of the clock signals from the low frequency to the high frequency, and the fixed frequency setting unit 53, which sets the fixed frequency, during the boosting operation period, in which the low output voltage of the DC-DC converter 3 gradually increases and reaches the predetermined voltage, and during the stable operation period which is performed after the boosting operation period. Consequently, because the frequency of the clock signals may be set according to the boosting operation and the stable operation of the DC-DC converter 3, the operation of the DC-DC converter 3 may be stabilized until the DC-DC converter 3 enters the stable operation period after the DC-DC converter 3 starts to operate.

In some of the above-described exemplary embodiments a setting means of the operation frequency of the DC-DC converter is provided outside of the DC-DC converter. In other exemplary embodiments, the oscillation frequency of the ring oscillator is controlled according to the output voltage of the DC-DC converter. In another exemplary embodiment, a detecting means for detecting the output voltage of the DC-DC converter is provided, and the frequency of the clock signals input to the DC-DC converter is variably controlled based on results obtained by comparing the detected voltage value with a threshold value.

Figure 14:
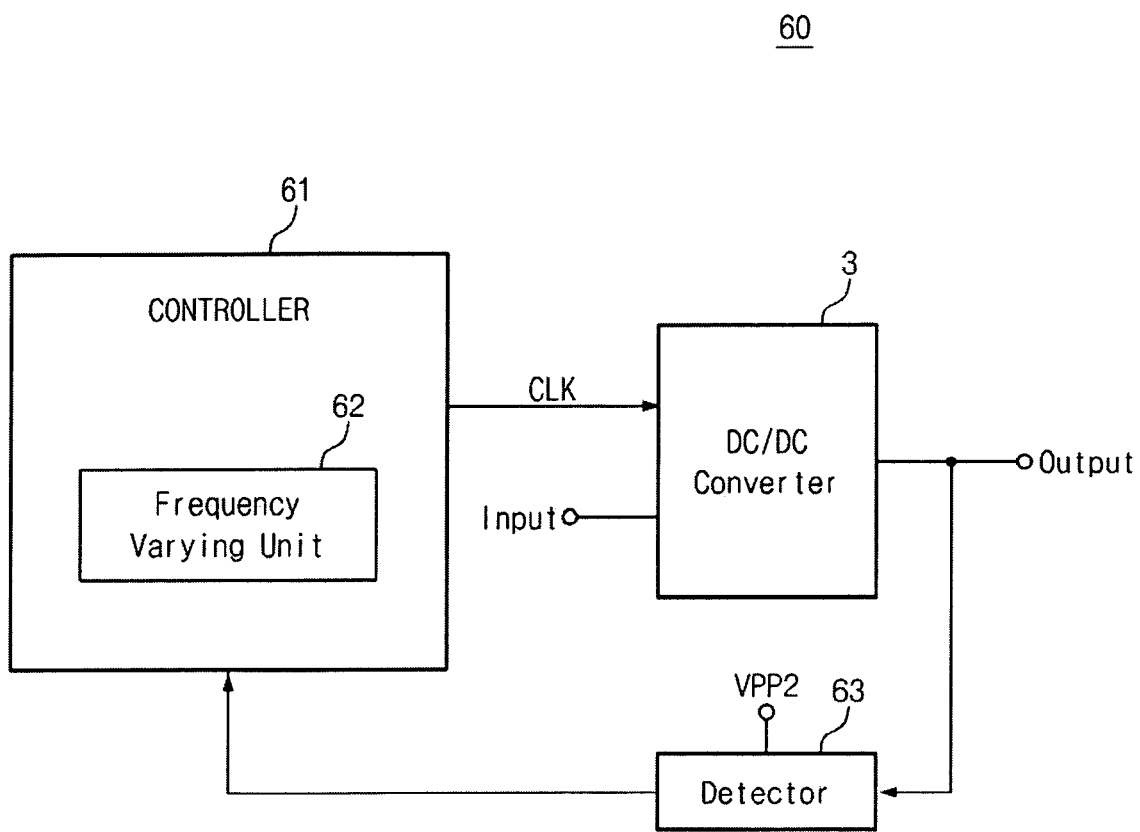
FIG. 14 is a block diagram showing the construction of a voltage boosting circuit according to an exemplary embodiment of the present invention.

FIG. 14 is a block diagram showing the construction of the voltage boosting circuit according to an exemplary embodiment of the present invention. In FIG. 14, because the same reference numerals are assigned to the elements identical to those of the voltage boosting circuit shown in FIG. 1, a detailed description thereof will be omitted. As illustrated in FIG. 14, the voltage boosting circuit 60 includes a controller 61, a detector 63, and a DC-DC converter 3. Further, the voltage boosting circuit 60 in accordance with this exemplary embodiment can be provided in the LCD module 100 having the TFT liquid crystal panel 101, as shown in FIG. 2. The TFT liquid crystal panel 101 is a low-temperature polysilicon TFT liquid crystal panel formed on a glass substrate, as in the case of the initially described exemplary embodiment. Further, the gate driver unit 102, the source driver unit 103, shown in FIG. 2, and the voltage boosting circuit 60 are also formed on the same glass substrate using a low-temperature polysilicon TFT. The LCD module 100 shown in FIG. 2 having the voltage boosting circuit 60 of this exemplary embodiment may be used as a small-medium LCD module mounted in electronic appliances, such as portable cell phones and personal computers.

The controller 61 includes a frequency varying unit 62. The controller 61 outputs the clock signals CLK to the DC-DC converter 3, in which the clock signals are generated by the frequency varying unit 62 based on comparison results between the voltage value detected by the detector 63 and the threshold value. Thus, the controller 61 feedback-controls the boosting operation for the boosting operation period of the DC-DC converter 3.

The detector 63 has functions of detecting the output voltage of the DC-DC converter 3, setting the threshold value used for determining the detected voltage value relative to a predetermined voltage value, and comparing the detected voltage value with the threshold value. The threshold value, for example, corresponds to an output voltage value when the supply voltage is boosted up to the constant voltage through the boosting operation of the DC-DC converter 3, as shown in FIG. 3. Further, the threshold value may be changed according to voltage values boosted by the DC-DC converter 3.

Figure 15:
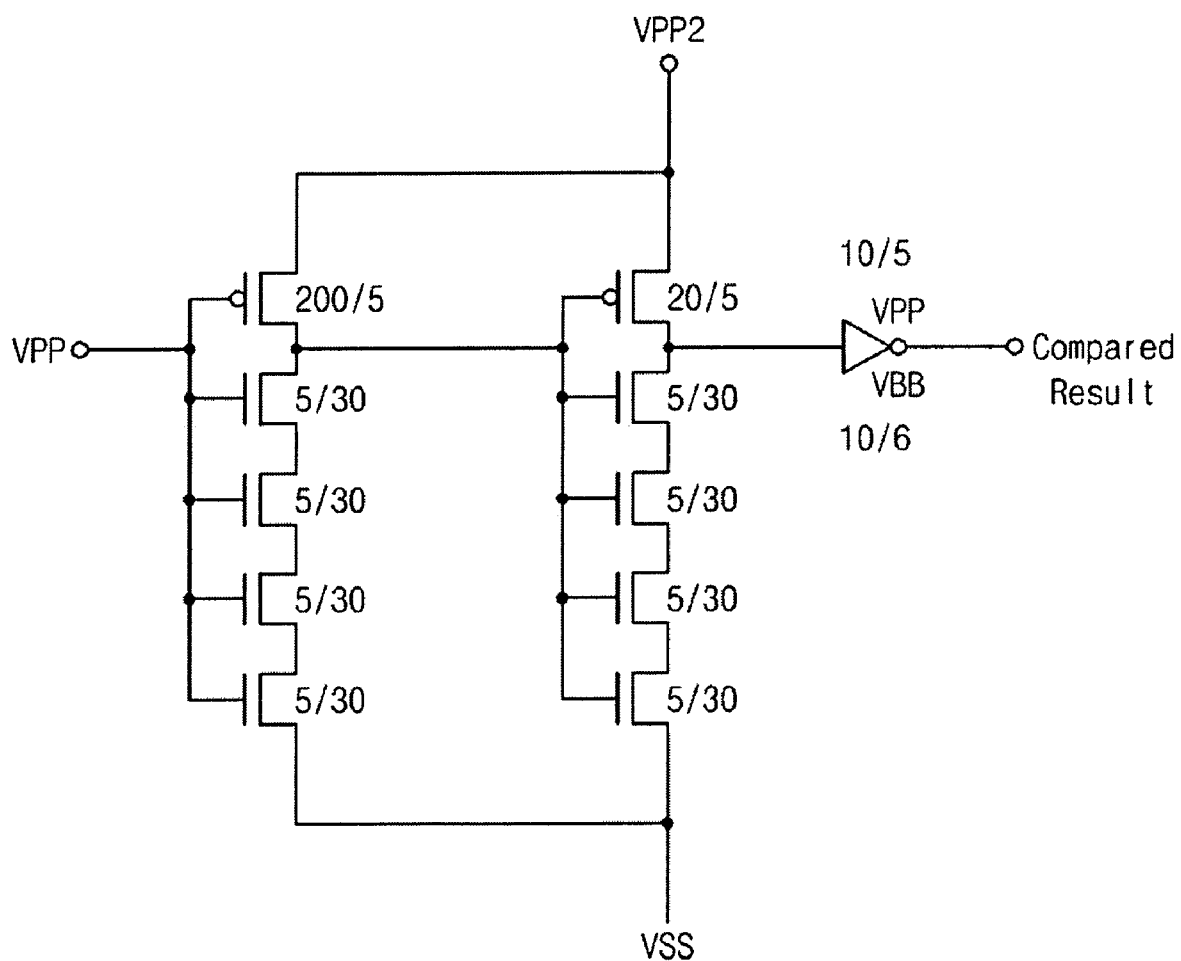
FIG. 15 is a circuit showing the construction of a detector according to an exemplary embodiment of the present invention.

FIG. 15 is a circuit diagram showing the construction of the detector 63.

In FIG. 15, the detector 63 is constructed using a CMOS inverter circuit. The output voltage VPP of the DC-DC converter 3 is fed back to the leftmost detection input terminal that includes the common connected gates of the CMOS input transistors, and the supply voltage VPP2 is input to the uppermost terminal from an external power supply (not shown). The detector 63 sets the threshold value, which is used for comparing the output voltage VPP of the DC-DC converter 3, by changing the device size in the CMOS inverter circuit. For example, the relation of: the W/L of a Pch-TFT>> the W/L of an Nch-TFT is satisfied in the circuit of FIG. 15, where W is the width of a channel of the TFT and L is the length of a channel of the TFT so that the threshold value of the CMOS inverter circuit may be set to a high level. The detector 63 outputs high or low signals to the frequency varying unit 62 according to the value of the output voltage VPP of the DC-DC converter 3 relative to the threshold voltage value. In the circuit construction of FIG. 15, the detector 63 outputs the high signals if the detected voltage value is equal to the threshold value or less, but outputs the low signals if the detected voltage is equal to the threshold value or above.

From the results of comparing the detected voltage value with the threshold value in detector 63, when the detected voltage is equal to the threshold value or less and the high signals are input, the frequency varying unit 62 gradually increases the frequency of the clock signals CLK from the low frequency to the high frequency. When the detected voltage is equal to or more than the threshold value and the low signals are input, however, the frequency varying unit 62 causes the frequency of the clock signals CLK to have a constant value.

Hereinafter, the operation of the voltage boosting circuit 60 according to this exemplary embodiment will be described.

When the voltage boosting circuit 60 of FIG. 14 is powered on and the DC-DC converter 3 operates, because the output voltage of the DC-DC converter 3 is low, the ON current of the TFT is small, and the propagation delay time between circuit devices is long, the frequency of the clock signals is set to a low level such that the clock signals CLK may be transmitted to the DC-DC converter 3 from the controller 61. That is, as described in the boosting operation during the boosting operation period of the DC-DC converter 3 shown in FIG. 3, the output voltage VPP is low when the power is turned on. Thus, because the voltage value detected by the detector 63 is a low voltage value and is lower than the threshold voltage value, the high signals are output to the frequency varying unit 62. As the high signals are received from the detector 63, the frequency varying unit 62 generates low-frequency clock signals CLK corresponding to the frequency when the power is turned on. The controller 61 outputs the clock signals CLK generated by the frequency varying unit 62 to the DC-DC converter 3.

The output voltage VPP of the DC-DC converter 3 is gradually increased during the boosting operation period. As the output voltage VPP to the detector 63 from the DC-DC converter 3 is gradually increased, the detected voltage value is gradually increased. Because the detected voltage value is lower than the threshold voltage value, however, the detector 63 outputs the high signals to the frequency varying unit 62.

As the high signals are input from the detector 63, the frequency varying unit 62 generates variable frequency clock signals CLK such that the frequency of the clock signals CLK may be increased from the low frequency to the high frequency. Then, the controller 61 outputs the variable frequency clock signals CLK to the DC-DC converter 3.

As described above, the frequency of the clock signals CLK is variably controlled during the boosting operation period for which the output voltage VPP of the DC-DC converter 3 is gradually increased after the power is turned on. If the output voltage VPP fed back from the DC-DC converter 3 is gradually increased and then the detected voltage value is equal to the threshold voltage value (the predetermined voltage) or greater, the detector 63 outputs the low signals to the frequency varying unit 62. As the low signals are input from the detector 63, the frequency varying unit 62 generates clock signals CLK having a constant frequency higher than the frequency of the clock signals CLK during the boosting operation period. Then, the controller 61 outputs the clock signals CLK having the constant frequency to the DC-DC converter 3. If the clock signals CLK are input from the controller 61, the DC-DC converter 3 causes the output voltage VPP to be constant and enters the stable operation period.

As described above, the voltage boosting circuit 60 of this exemplary embodiment uses the detector 63, which detects the output voltage VPP of the DC-DC converter 3, compares the detected voltage value with the threshold value and outputs the comparison results, and the frequency varying unit 62 that gradually increases the frequency of the clock signals CLK when the detected voltage value is equal to the threshold value or less, and causes the frequency of the clock signals CLK to be constant when the detected voltage value is equal to the threshold value or more. That is, the operation frequency during the boosting operation period of the DC-DC converter 3 is variably controlled according to the comparison results. Accordingly, the frequency of the clock signals CLK is variably controlled according to the output voltage during the boosting operation period of the DC-DC converter 3, so that the operation of the DC-DC converter 3 may be stabilized until the DC-DC converter 3 enters the stable operation period after the DC-DC converter 3 starts to operate.

In the previous exemplary embodiment, the output voltage of the DC-DC converter is detected by the detector and the frequency of the clock signals CLK is variably controlled according to the comparison results of the detected voltage value and the threshold value. In the present exemplary embodiment, a variable frequency setting unit and a fixed frequency setting unit set the frequency of the clock signals CLK according to the boosting and stable operations of the DC-DC converter, a detector compares the output voltage of the DC-DC converter with the threshold value, and the variable frequency setting unit or the fixed frequency setting unit is selectively used based on results obtained by comparing the output voltage with the threshold value.

Figure 16:
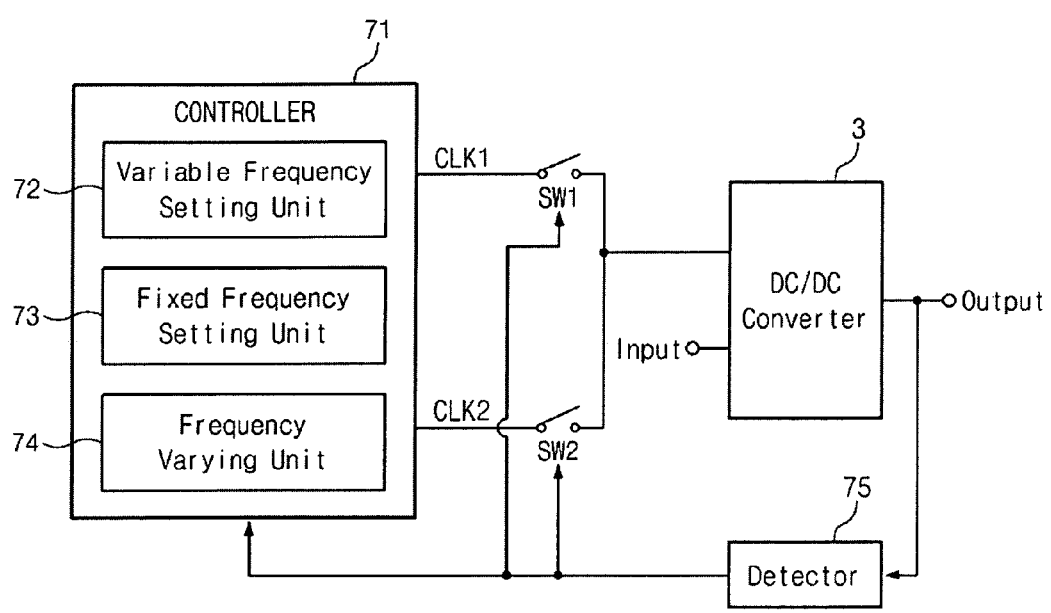
FIG. 16 is a block diagram showing the construction of a voltage boosting circuit according to an exemplary embodiment of the present invention.

FIG. 16 is a block diagram showing the construction of the voltage boosting circuit according to the another exemplary embodiment of the present invention. In FIG. 16, because the same reference numerals are assigned to the elements identical to those of the voltage boosting circuit shown in FIG. 1, a detailed description thereof will be omitted. As illustrated in FIG. 16, the voltage boosting circuit 70 includes a controller 71, a detector 75, switches SW1 and SW2, and a DC-DC converter 3. Further, the voltage boosting circuit 70 in accordance with this exemplary embodiment can be provided in the LCD module 100 having the TFT liquid crystal panel 101 as shown in FIG. 2. The TFT liquid crystal panel 101 is a low-temperature polysilicon TFT liquid crystal panel formed on a glass substrate, as in the case of the initially described exemplary embodiment. Further the gate driver 102, the source driver 103, and the voltage boosting circuit 70 are also formed on the same glass substrate using a low-temperature polysilicon TFT. The LCD module 100 shown in FIG. 2 having the voltage boosting circuit 70 of the above-described exemplary embodiment may be used as a small-medium LCD module mounted in electronic appliances, such as portable cell phones and personal computers.

The controller 71 includes a variable frequency setting unit 72, a fixed frequency setting unit 73 and a frequency varying unit 74. The controller 71 outputs clock signals CLK generated by the frequency varying unit 74 to the DC-DC converter 3 based on switch control signals output from the detector 75, and feedback-controls the boosting operation and the stable operation of the DC-DC converter 3.

The variable frequency setting unit 72 sets frequencies in order to variably control the frequency of the clock signals CLK at a predetermined operation timing, in which the clock signals CLK are used for the boosting operation during the boosting operation period of the DC-DC converter 3. More specifically, the variable frequency setting unit 72 sets the frequencies, which correspond to the boosting operation period, based on the boosting operation during the boosting operation period in which the output voltage is gradually increased after the DC-DC converter 3 is powered on.

The fixed frequency setting unit 73 sets the fixed frequency of the clock signals CLK used for the stable operation during the stable operation period of the DC-DC converter 3. More specifically, the fixed frequency setting unit 73 sets the fixed frequency, which corresponds to the stable operation period, based on the stable operation during the stable operation period after the boosting operation period of the DC-DC converter 3.

The frequency varying unit 74 reads the variable frequency and the fixed frequency, which are set by the variable frequency setting unit 72 and the fixed frequency setting unit 73, respectively, to generate clock signals CLK1 and CLK2. More specifically, when high signals are input from an output voltage detection comparator (not shown in FIG. 16) according to the comparison results, the frequency varying unit 74 generates the clock signals CLK1 for the boosting operation period based on the frequencies set by the variable frequency setting unit 72. When low signals are input from the output voltage detection comparator (not shown in FIG. 16) according to the comparison results, the frequency varying unit 74 generates the clock signals CLK2 for the stable operation period based on the fixed frequency set by the fixed frequency setting unit 73.

Figure 17:
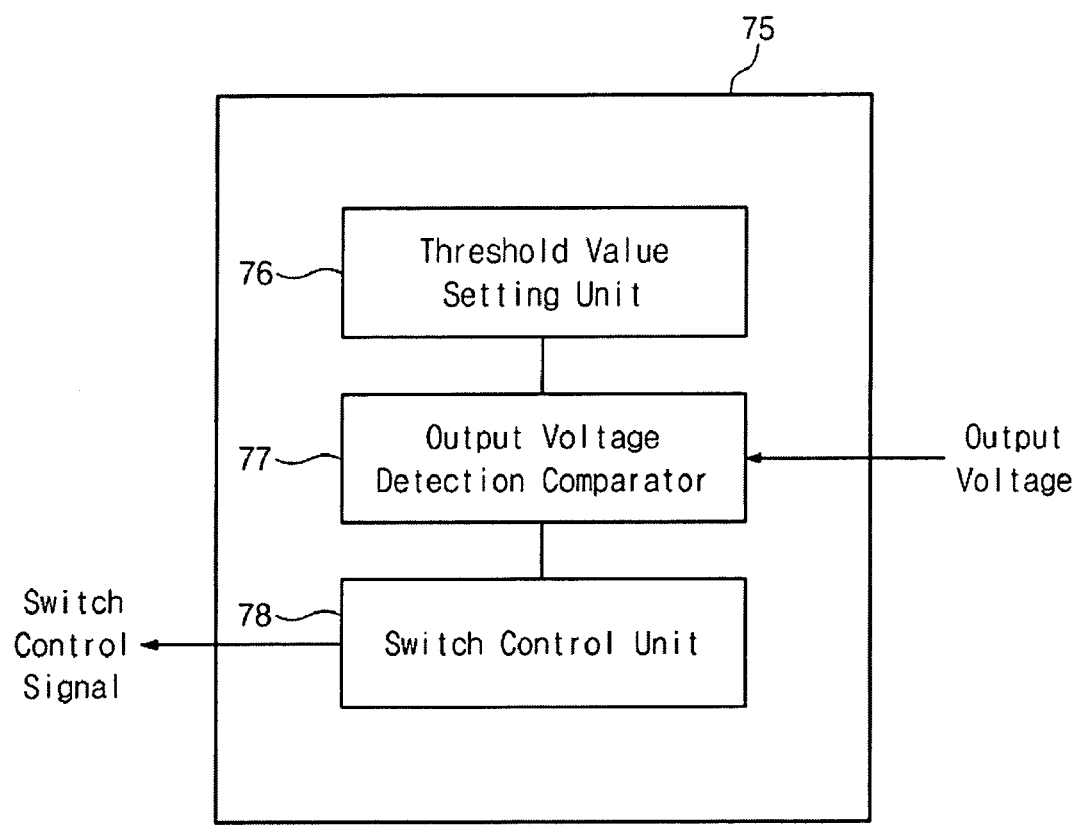
FIG. 17 is a block showing the construction of a detector according to an exemplary embodiment of the present invention.

As illustrated in FIG. 17, the detector 75 includes a threshold value setting unit 76, the output voltage detection comparator 77, and a switch control unit 78.

The threshold value setting unit 76 sets a threshold value used to determine the voltage value of the output voltage fed from the DC-DC converter 3 relative to a predetermined voltage value. The threshold value, for example, corresponds to an output voltage value when the supply voltage is boosted to the predetermined voltage through the boosting operation of the DC-DC converter 3, as shown in FIG. 3. Further, the threshold value may be randomly changed according to voltage values boosted by the DC-DC converter 3.

The output voltage detection comparator 77 detects the output voltage of the DC-DC converter 3, compares the detected voltage value with the threshold value set by the threshold value setting unit 76, and outputs results obtained through the comparison to the switch control unit 78. When the detected voltage value is equal to the threshold value or less, the output voltage detection comparator 77 outputs high signals to the switch control unit 78. When the detected voltage value is equal to the threshold value or more, however, the output voltage detection comparator 77 outputs low signals to the switch control unit 78.

The switch control unit 78 outputs switch control signals to the switches SW1 and SW2 and the frequency varying unit 74 based on the comparison results, in which the switch control signals turn the switches SW1 and SW2 on or off. When the high signals are received from the output voltage detection comparator 77, the switch control unit 78 outputs the switch control signals to the switches SW1 and SW2 and the frequency varying unit 74, in which the switch control signals turn on the switch SW1 and turn off the switch SW2. When the tow signals are received from the output voltage detection comparator 77, however, the switch control unit 78 outputs the switch control signals to the switches SW1 and SW2 and the frequency varying unit 74, in which the switch control signals turn off the switch SW1 and turn on the switch SW2.

Hereinafter, the operation of the voltage boosting circuit 70 according to the present exemplary embodiment will be described.

When the voltage boosting circuit 70 is powered on and the DC-DC converter 3 operates, because the output voltage of the DC-DC converter 3 is low, the ON current of the TFT is small, and the propagation delay time between circuit devices is long, and the frequency of the clock signals is set to a low level such that the clock signals CLK may be transmitted to the DC-DC converter 3 from the controller 71. That is, as described in the boosting operation during the boosting operation period of the DC-DC converter 3 in FIG. 3, the output voltage of the DC-DC converter 3 is low when the power is turned on. Thus, the voltage value detected by the output voltage detection comparator 77 is a low-voltage value and is lower than the threshold value set by the threshold value setting unit 76. In such a case, the output voltage detection comparator 77 outputs the high signals to the switch control unit 78 according to the comparison results. When the high signals are input from the output voltage detection comparator 77, the switch control unit 78 outputs the switch control signals to the switches SW1 and SW2 and the frequency varying unit 74, in which the switch control signals turn on the switch SW1 and turn off the switch SW2.

The frequency varying unit 74 generates the low-frequency clock signals CLK1 corresponding to the frequency when the power is turned on, which is set by the variable frequency setting unit 72. The controller 71 outputs the generated clock signals CLK1 to the DC-DC converter 3 via the switch SW1.

When the low-frequency clock signals CLK1 are input from the controller 71 the output voltage of the DC-DC converter 3 is gradually increased. As the output voltage input from the DC-DC converter 3 is gradually increased, the voltage value detected by the output voltage detection comparator 77 is gradually increased.

If the detected voltage value is equal to the threshold value or more the output voltage detection comparator 77 outputs the low signals to the switch control unit 78. When the low signals are input from the output voltage detection comparator 77, the switch control unit 78 outputs the switch control signals to the switches SW1 and SW2 and the frequency varying unit 74, in which the switch control signals turn off the switch SW1 and turn on the switch SW2.

The frequency varying unit 74 generates the fixed frequency clock signals CLK2 corresponding to the stable operation period, which is set by the fixed frequency setting unit 73. The controller 71 outputs the generated clock signals CLK2 to the DC-DC converter 3 via the switch SW2.

As described above, according to the voltage boosting circuit 70 of this exemplary embodiment the detector 75 that detects the output voltage of the voltage boosting circuit 70 includes the threshold value setting unit 76 that sets the threshold value used to compare the detected voltage value, the output voltage detection comparator 77 that outputs the results obtained by comparing the detected voltage value with the threshold value, and the switch control unit 78 that turns the switches SW1 and SW2 on or off based on the comparison results. Further, the controller 71 includes the variable frequency setting unit 72, the fixed frequency setting unit 73 and the frequency varying unit 74, in which the variable frequency setting unit 72 gradually increases the frequency of the clock signals from the low frequency to the high frequency through the boosting operation during the boosting operation period for which the low output voltage of the DC-DC converter 3 is gradually increased. The fixed frequency setting unit 73 sets the fixed frequency when the stable operation period, in which the predetermined voltage is constantly output, is performed after the boosting operation period of the DC-DC converter 3. The frequency varying unit 74 generates the clock signals CLK of each frequency, which are set by the variable frequency setting unit 72 or the fixed frequency setting unit 73, according to the switch control signals input from the switch control unit 78.

Consequently, the frequency of the clock signals CLK may be set according to the boosting and stable operations of the DC-DC converter 3, so that the operation of the DC-DC converter 3 may be stabilized until the stable operation period is performed after the power is turned on and the boosting operation period is performed.

In the above-described exemplary embodiments the voltage boosting circuit and the voltage boosting/dropping circuit of the present invention are applied to the TFT LCD. The present invention may also be applied to a display panel that uses a pixel display device, however, as well as the TFT LCD.

According to the voltage boosting circuit and the voltage boosting/dropping circuit of the exemplary embodiments of the present invention as described above, the operation of the DC-DC converter may be stabilized during the boosting operation period or the dropping operation period until the stable operation period is performed after the DC-DC converter starts to operate.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A voltage boosting circuit comprising:
    a boosting circuit including transistors for boosting a supply voltage up to a predetermined voltage according to input clock signals;
    a frequency setting unit setting frequencies of the clock signals used for a boosting operation period during which the boosting circuit boosts the supply voltage up to the predetermined voltage; and
    a frequency varying unit altering the frequency of the clock signals during the boosting operation period of the boosting circuit based on the frequencies set by the frequency setting unit.

2. The voltage boosting circuit of claim 1, wherein the transistors comprise thin-film transistors and the frequency setting unit sets the frequencies of the clock signals according to characteristics of the thin-film transistors during the boosting operation period.

3. The voltage boosting circuit of claim 1, wherein the boosting operation period is a period extending until the predetermined voltage is output from the boosting circuit after the boosting circuit is powered on.

4. The voltage boosting circuit of claim 3, wherein the frequency setting unit sets the frequencies of the clock signals corresponding to each period of the boosting operation period.

5. A voltage boosting circuit comprising:
    a boosting circuit including transistors for boosting a supply voltage up to a predetermined voltage according to input clock signals; and
    a frequency varying unit altering frequencies of the crock signals according to an output voltage during a boosting operation period of the boosting circuit, in which the clock signals are used for the boosting operation period during which the boosting circuit boosts the supply voltage up to the predetermined voltage.

6. The voltage boosting circuit of claim 5, wherein the transistors comprise thin-film transistors, and the frequency varying unit comprises a ring oscillator.

7. The voltage boosting circuit of claim 5, further comprising:
    a first frequency setting unit setting a first frequency of the clock signals used for a boosting operation period during which the boosting circuit boosts the supply voltage up to the predetermined voltage;
    a second frequency setting unit setting a second frequency of the clock signals used for a stable operation period during which the boosting circuit outputs the predetermined voltage after completing the boosting operation period; and
    a selector selecting either the first frequency setting unit or the second frequency setting unit according to the boosting operation period or the stable operation period of the boosting circuit respectively.

8. The voltage boosting circuit of claim 5, further comprising:
    a variable frequency setting unit setting a variable frequency of the clock signals used for a boosting operation period during which the boosting circuit boosts the supply voltage up to the predetermined voltage;
    a fixed frequency setting unit setting a fixed frequency of the clock signals used for a stable operation period during which the boosting circuit outputs the predetermined voltage after completing the boosting operation period; and
    a selector selecting either the variable frequency setting unit or the fixed frequency setting unit according to the boosting operation period or the stable operation period of the boosting circuit, respectively.

9. A voltage boosting circuit comprising:
    a boosting circuit including transistors for boosting a supply voltage up to a predetermined voltage according to input clock signals;
    a detector detecting an output voltage value of the boosting circuit comparing the detected voltage value with a threshold value, and outputting results obtained by comparing the detected voltage value with the threshold value; and
    a frequency varying unit altering a frequency of the clock signals during an operation of the boosting circuit according to the comparison results.

10. The voltage boosting circuit of claim 9, wherein the threshold value is set according to the predetermined voltage output from the boosting circuit.

11. The voltage boosting circuit of claim 9, wherein the frequency varying unit alters the frequency of the clock signals when the detected voltage value is equal to the threshold value or less, and fixes the frequency of the clock signals when the detected voltage value is equal to the threshold value or more.

12. The voltage boosting circuit of claim 9, wherein the transistors comprise thin-film transistors.

13. The voltage boosting circuit of claim 9, further comprising:
    a variable frequency setting unit setting a variable frequency of the clock signals used for a boosting operation period during which the boosting circuit boosts the supply voltage up to the predetermined voltage;
    a fixed frequency setting unit setting a fixed frequency of the clock signals used for a stable operation period during which the boosting circuit outputs the predetermined voltage after completing the boosting operation period; and
    a selector selecting the variable frequency setting unit or the fixed frequency setting unit according to values of the output voltage detected by the detector.

14. A voltage boosting/dropping circuit comprising:
    a boosting/dropping circuit including transistors for boosting and dropping a supply voltage up to a predetermined voltage according to input clock signals; and
    a frequency varying unit altering a frequency of the clock signals according to an output voltage during a boosting operation period or a dropping operation period of the boosting/dropping circuit, in which the clock signals are used for the boosting operation period, during which the boosting/dropping circuit boosts the supply voltage up to the predetermined voltage, or the dropping operation period during which the boosting/dropping circuit drops the supply voltage to the predetermined voltage.

15. The voltage boosting circuit of claim 14, wherein the transistors comprise thin-film transistors, and the frequency varying unit comprises a ring oscillator.

16. A liquid crystal display that uses a voltage boosting circuit, wherein the voltage boosting circuit comprises:
- a boosting circuit including transistors for boosting a supply voltage up to a predetermined voltage according to input clock signals;
- a frequency setting unit setting frequencies of the clock signals used for a boosting operation period during which the boosting circuit boosts the supply voltage up to the predetermined voltage; and
- a frequency varying unit altering the frequency of the clock signals during the boosting operation period of the boosting circuit based on the frequencies set by the frequency setting unit.

* * * * *